(12) United States Patent
Endo

(10) Patent No.: US 10,165,086 B2
(45) Date of Patent: Dec. 25, 2018

(54) INFORMATION PROCESSING SYSTEM, SERVER APPARATUS, INFORMATION PROCESSING METHOD, AND COMPUTER PROGRAM PRODUCT

(71) Applicants: KABUSHIKI KAISHA TOSHIBA, Minato-ku, Tokyo (JP); TOSHIBA SOLUTIONS CORPORATION, Kawasaki-shi, Kanagawa (JP)

(72) Inventor: Kotaro Endo, Tokyo (JP)

(73) Assignees: KABUSHIKI KAISHA TOSHIBA, Tokyo (JP); TOSHIBA SOLUTIONS CORPORATION, Kawasaki-Shi (JP)

( * ) Notice: Subject to any disclaimer, the term of this patent is extended or adjusted under 35 U.S.C. 154(b) by 494 days.

(21) Appl. No.: 15/060,715

(22) Filed: Mar. 4, 2016

(65) Prior Publication Data
US 2016/0191676 A1  Jun. 30, 2016

Related U.S. Application Data

(63) Continuation of application No. PCT/JP2013/073847, filed on Sep. 4, 2013.

(51) Int. Cl.
*G06F 11/14* (2006.01)
*G06F 17/30* (2006.01)
(Continued)

(52) U.S. Cl.
CPC .......... *H04L 67/42* (2013.01); *G06F 11/1471* (2013.01); *G06F 17/30348* (2013.01);
(Continued)

(58) Field of Classification Search
CPC ... H04L 41/00; H04L 41/082; H04L 41/0833; G06Q 10/107; G06F 11/2028; G06F 11/3024
(Continued)

(56) References Cited

U.S. PATENT DOCUMENTS 5,598,529 A * 1/1997 Garay ................... G06F 11/182
714/11
6,178,522 B1 * 1/2001 Zhou ..................... G06F 11/181
714/11
(Continued)

FOREIGN PATENT DOCUMENTS

EP          1640869     3/2006
JP          06-83661    3/1994
(Continued)

OTHER PUBLICATIONS

Written Opinion for International Patent Application No. PCT/JP2013/073847 dated Dec. 10, 2013,3 pages.
(Continued)

*Primary Examiner* — Mahran Y Abu Roumi
(74) *Attorney, Agent, or Firm* — Amin, Turocy & Watson LLP

(57) ABSTRACT

According to an embodiment, an information processing system includes a client apparatus and three or more server apparatuses that each store data. The server apparatus includes a first storage, a receiver, a generator, a selector, a transmitter, and a changer. When the number of requests indicating identical changes among the requests of the data candidates is larger than a first threshold, the selector selects one of the requests indicating identical changes, and sets the state of the selected request to a second state. The transmitter transmits the data candidate including the selected request to one or more server apparatuses. When the number of requests in the second state among the requests of the data candidates is larger than a second threshold, the changer updates the history data and changes the data by using one of the data candidates including the requests in the second state.

13 Claims, 16 Drawing Sheets

(51) Int. Cl.
*H04L 29/06* (2006.01)
*H04L 29/08* (2006.01)
*G06F 11/20* (2006.01)

(52) U.S. Cl.
CPC ........ *G06F 17/30575* (2013.01); *H04L 67/10* (2013.01); *G06F 11/20* (2013.01)

(58) Field of Classification Search
USPC .................................. 709/205, 220; 714/10
See application file for complete search history.

(56) References Cited

U.S. PATENT DOCUMENTS

| | | | | |
|---|---|---|---|---|
| 6,567,927 | B1* | 5/2003 | Brinkmann | G06F 11/181 |
| | | | | 714/10 |
| 6,799,222 | B1* | 9/2004 | Endo | H04L 47/10 |
| | | | | 709/205 |
| 7,272,632 | B2 | 9/2007 | Endo | |
| 2002/0194276 | A1* | 12/2002 | Endo | G06F 11/1482 |
| | | | | 709/205 |
| 2005/0021695 | A1* | 1/2005 | Takamine | H04L 12/1822 |
| | | | | 709/220 |
| 2010/0043010 | A1* | 2/2010 | Yokoyama | G06F 11/2038 |
| | | | | 718/105 |

FOREIGN PATENT DOCUMENTS

| | | |
|---|---|---|
| JP | 2000-330811 | 11/2000 |
| JP | 2001-051962 | 2/2001 |
| JP | 2002-108639 | 4/2002 |
| JP | 2002-517819 | 6/2002 |
| JP | 2003-067215 | 3/2003 |
| JP | 2004-348180 | 12/2004 |
| JP | 2007-219598 | 8/2007 |
| JP | 2010-044553 | 2/2010 |
| JP | 2010-152559 | 7/2010 |
| JP | 2011-118747 | 6/2011 |
| JP | 2011-253390 | 12/2011 |
| JP | 2013-025765 | 2/2013 |
| WO | 2015-140942 | 9/2015 |
| WO | 2016-020986 | 2/2016 |

OTHER PUBLICATIONS

International Search Report for International Patent Application No. PCT/JP2013/073847 dated Dec. 10, 2013, 4 pages.

ZooKeeper: A Distributed Coordination Service for Distributed Applications. <URL:http://zookeeper.apache.org/doc/current/zookeeperOver.html> Last published Sep. 24, 2012.

International Search Report for International Patent Application No. PCT/JP2014/057418 dated Jun. 17, 2014, 4 pages.

International Search Report for International Patent Application No. PCT/JP2014/070625 dated Nov. 11, 2014, 4 pages.

* cited by examiner

FIG.3

| ORDER NUMBER | REQUEST |
|---|---|
| 1 | $R_1$ |
| 2 | $R_2$ |
| 3 | $R_3$ |
| ⋮ | ⋮ |
| S-1 | $R_{S-1}$ |
| S | UNUSED |
| ⋮ | ⋮ |

CURRENT ORDER NUMBER → S

FIG.9

| SERVER APPARATUS 10-1 | | | SERVER APPARATUS 10-2 | | | SERVER APPARATUS 10-3 | | | SERVER APPARATUS 10-4 | | | SERVER APPARATUS 10-5 | | |
|---|---|---|---|---|---|---|---|---|---|---|---|---|---|---|
| CURRENT ROUND NUMBER 1 | | STATE | CURRENT ROUND NUMBER 1 | | STATE | CURRENT ROUND NUMBER 1 | | STATE | CURRENT ROUND NUMBER 1 | | STATE | CURRENT ROUND NUMBER 1 | | STATE |
| SELF CANDIDATE | | FIRST STATE | SELF CANDIDATE | | UNDETER-MINED | SELF CANDIDATE | | UNDETER-MINED | SELF CANDIDATE | | UNDETER-MINED | SELF CANDIDATE | | UNDETER-MINED |
| OTHER CANDIDATE | | STATE | OTHER CANDIDATE | | STATE | OTHER CANDIDATE | | STATE | OTHER CANDIDATE | | STATE | OTHER CANDIDATE | | STATE |
| | | UNDETER-MINED | | | UNDETER-MINED | | | UNDETER-MINED | | | UNDETER-MINED | | | UNDETER-MINED |
| | | UNDETER-MINED | | | UNDETER-MINED | | | UNDETER-MINED | | | UNDETER-MINED | | | UNDETER-MINED |
| | | UNDETER-MINED | | | UNDETER-MINED | | | UNDETER-MINED | | | UNDETER-MINED | | | UNDETER-MINED |
| | | UNDETER-MINED | | | UNDETER-MINED | | | UNDETER-MINED | | | UNDETER-MINED | | | UNDETER-MINED |

→ AFTER PROCESSES WITH GENERATORS

| SERVER APPARATUS 10-1 | | | SERVER APPARATUS 10-2 | | | SERVER APPARATUS 10-3 | | | SERVER APPARATUS 10-4 | | | SERVER APPARATUS 10-5 | | |
|---|---|---|---|---|---|---|---|---|---|---|---|---|---|---|
| CURRENT ROUND NUMBER 1 | | STATE | CURRENT ROUND NUMBER 1 | | STATE | CURRENT ROUND NUMBER 1 | | STATE | CURRENT ROUND NUMBER 1 | | STATE | CURRENT ROUND NUMBER 1 | | STATE |
| SELF CANDIDATE | A | FIRST STATE | SELF CANDIDATE | | UNDETER-MINED | SELF CANDIDATE | B | FIRST STATE | SELF CANDIDATE | | UNDETER-MINED | SELF CANDIDATE | C | FIRST STATE |
| OTHER CANDIDATE | | STATE | OTHER CANDIDATE | | STATE | OTHER CANDIDATE | | STATE | OTHER CANDIDATE | | STATE | OTHER CANDIDATE | | STATE |
| | | UNDETER-MINED | | | UNDETER-MINED | | | UNDETER-MINED | | | UNDETER-MINED | | | UNDETER-MINED |
| | | UNDETER-MINED | | | UNDETER-MINED | | | UNDETER-MINED | | | UNDETER-MINED | | | UNDETER-MINED |
| | | UNDETER-MINED | | | UNDETER-MINED | | | UNDETER-MINED | | | UNDETER-MINED | | | UNDETER-MINED |
| | | UNDETER-MINED | | | UNDETER-MINED | | | UNDETER-MINED | | | UNDETER-MINED | | | UNDETER-MINED |

FIG. 11

Before:

| SERVER APPARATUS 10-1 CURRENT ROUND NUMBER 2 | | |
|---|---|---|
| | SELF CANDIDATE | STATE |
| SELF CANDIDATE | A | FIRST STATE |
| OTHER CANDIDATE | B | FIRST STATE |
| | C | FIRST STATE |
| | | UNDETERMINED |
| | | UNDETERMINED |

| SERVER APPARATUS 10-2 CURRENT ROUND NUMBER 2 | | |
|---|---|---|
| | SELF CANDIDATE | STATE |
| SELF CANDIDATE | B | FIRST STATE |
| OTHER CANDIDATE | B | FIRST STATE |
| | C | FIRST STATE |
| | | UNDETERMINED |
| | | UNDETERMINED |

| SERVER APPARATUS 10-3 CURRENT ROUND NUMBER 2 | | |
|---|---|---|
| | SELF CANDIDATE | STATE |
| SELF CANDIDATE | B | FIRST STATE |
| OTHER CANDIDATE | A | FIRST STATE |
| | C | FIRST STATE |
| | | UNDETERMINED |
| | | UNDETERMINED |

| SERVER APPARATUS 10-4 CURRENT ROUND NUMBER 2 | | |
|---|---|---|
| | SELF CANDIDATE | STATE |
| SELF CANDIDATE | A | FIRST STATE |
| OTHER CANDIDATE | A | FIRST STATE |
| | C | FIRST STATE |
| | | UNDETERMINED |
| | | UNDETERMINED |

| SERVER APPARATUS 10-5 CURRENT ROUND NUMBER 2 | | |
|---|---|---|
| | SELF CANDIDATE | STATE |
| SELF CANDIDATE | C | FIRST STATE |
| OTHER CANDIDATE | A | FIRST STATE |
| | B | FIRST STATE |
| | | UNDETERMINED |
| | | UNDETERMINED |

→ AFTER PROCESSES WITH CHANGERS

After:

| SERVER APPARATUS 10-1 CURRENT ROUND NUMBER 3 | | |
|---|---|---|
| | SELF CANDIDATE | STATE |
| SELF CANDIDATE | A | FIRST STATE |
| OTHER CANDIDATE | | UNDETERMINED |
| | | UNDETERMINED |
| | | UNDETERMINED |
| | | UNDETERMINED |

| SERVER APPARATUS 10-2 CURRENT ROUND NUMBER 3 | | |
|---|---|---|
| | SELF CANDIDATE | STATE |
| SELF CANDIDATE | B | FIRST STATE |
| OTHER CANDIDATE | | UNDETERMINED |
| | | UNDETERMINED |
| | | UNDETERMINED |
| | | UNDETERMINED |

| SERVER APPARATUS 10-3 CURRENT ROUND NUMBER 3 | | |
|---|---|---|
| | SELF CANDIDATE | STATE |
| SELF CANDIDATE | B | FIRST STATE |
| OTHER CANDIDATE | | UNDETERMINED |
| | | UNDETERMINED |
| | | UNDETERMINED |
| | | UNDETERMINED |

| SERVER APPARATUS 10-4 CURRENT ROUND NUMBER 3 | | |
|---|---|---|
| | SELF CANDIDATE | STATE |
| SELF CANDIDATE | A | FIRST STATE |
| OTHER CANDIDATE | | UNDETERMINED |
| | | UNDETERMINED |
| | | UNDETERMINED |
| | | UNDETERMINED |

| SERVER APPARATUS 10-5 CURRENT ROUND NUMBER 3 | | |
|---|---|---|
| | SELF CANDIDATE | STATE |
| SELF CANDIDATE | C | FIRST STATE |
| OTHER CANDIDATE | | UNDETERMINED |
| | | UNDETERMINED |
| | | UNDETERMINED |
| | | UNDETERMINED |

FIG.13

| SERVER APPARATUS 10-1 CURRENT ROUND NUMBER 4 | | | SERVER APPARATUS 10-2 CURRENT ROUND NUMBER 4 | | | SERVER APPARATUS 10-3 CURRENT ROUND NUMBER 4 | | | SERVER APPARATUS 10-4 CURRENT ROUND NUMBER 4 | | | SERVER APPARATUS 10-5 CURRENT ROUND NUMBER 4 | | |
|---|---|---|---|---|---|---|---|---|---|---|---|---|---|---|
| SELF CANDIDATE | | STATE | SELF CANDIDATE | | STATE | SELF CANDIDATE | | STATE | SELF CANDIDATE | | STATE | SELF CANDIDATE | | STATE |
| A | | FIRST STATE | A | | FIRST STATE | B | | FIRST STATE | A | | FIRST STATE | B | | FIRST STATE |
| OTHER CANDIDATE | | STATE | OTHER CANDIDATE | | STATE | OTHER CANDIDATE | | STATE | OTHER CANDIDATE | | STATE | OTHER CANDIDATE | | STATE |
| B | | FIRST STATE | A | | FIRST STATE | A | | FIRST STATE | B | | FIRST STATE | B | | FIRST STATE |
| B | | FIRST STATE | B | | FIRST STATE | A | | FIRST STATE | B | | FIRST STATE | A | | FIRST STATE |
| A | | FIRST STATE | B | | FIRST STATE | | | UNDETER-MINED | | | UNDETER-MINED | A | | FIRST STATE |
| | | UNDETER-MINED | | | UNDETER-MINED | | | UNDETER-MINED | | | UNDETER-MINED | | | UNDETER-MINED |

→ AFTER PROCESSES WITH CHANGERS

| SERVER APPARATUS 10-1 CURRENT ROUND NUMBER 5 | | | SERVER APPARATUS 10-2 CURRENT ROUND NUMBER 5 | | | SERVER APPARATUS 10-3 CURRENT ROUND NUMBER 5 | | | SERVER APPARATUS 10-4 CURRENT ROUND NUMBER 5 | | | SERVER APPARATUS 10-5 CURRENT ROUND NUMBER 5 | | |
|---|---|---|---|---|---|---|---|---|---|---|---|---|---|---|
| SELF CANDIDATE | | STATE | SELF CANDIDATE | | STATE | SELF CANDIDATE | | STATE | SELF CANDIDATE | | STATE | SELF CANDIDATE | | STATE |
| A | | FIRST STATE | A | | FIRST STATE | A | | FIRST STATE | B | | FIRST STATE | A | | FIRST STATE |
| OTHER CANDIDATE | | STATE | OTHER CANDIDATE | | STATE | OTHER CANDIDATE | | STATE | OTHER CANDIDATE | | STATE | OTHER CANDIDATE | | STATE |
| | | UNDETER-MINED | | | UNDETER-MINED | | | UNDETER-MINED | | | UNDETER-MINED | | | UNDETER-MINED |
| | | UNDETER-MINED | | | UNDETER-MINED | | | UNDETER-MINED | | | UNDETER-MINED | | | UNDETER-MINED |
| | | UNDETER-MINED | | | UNDETER-MINED | | | UNDETER-MINED | | | UNDETER-MINED | | | UNDETER-MINED |
| | | UNDETER-MINED | | | UNDETER-MINED | | | UNDETER-MINED | | | UNDETER-MINED | | | UNDETER-MINED |

FIG.14

| SERVER APPARATUS 10-1 | | | SERVER APPARATUS 10-2 | | | SERVER APPARATUS 10-3 | | | SERVER APPARATUS 10-4 | | | SERVER APPARATUS 10-5 | | |
|---|---|---|---|---|---|---|---|---|---|---|---|---|---|---|
| CURRENT ROUND NUMBER 5 | | STATE | CURRENT ROUND NUMBER 5 | | STATE | CURRENT ROUND NUMBER 5 | | STATE | CURRENT ROUND NUMBER 5 | | STATE | CURRENT ROUND NUMBER 5 | | STATE |
| SELF CANDIDATE | A | FIRST STATE | SELF CANDIDATE | A | FIRST STATE | SELF CANDIDATE | A | FIRST STATE | SELF CANDIDATE | B | FIRST STATE | SELF CANDIDATE | A | FIRST STATE |
| OTHER CANDIDATE | A | FIRST STATE | OTHER CANDIDATE | A | FIRST STATE | OTHER CANDIDATE | A | FIRST STATE | OTHER CANDIDATE | A | FIRST STATE | OTHER CANDIDATE | A | FIRST STATE |
| | A | FIRST STATE | | A | FIRST STATE | | B | FIRST STATE | | A | FIRST STATE | | A | FIRST STATE |
| | B | FIRST STATE | | B | FIRST STATE | | | UNDETERMINED | | | UNDETERMINED | | A | FIRST STATE |
| | A | FIRST STATE | | | UNDETERMINED | | | UNDETERMINED | | | UNDETERMINED | | | UNDETERMINED |

→ AFTER PROCESSES WITH SELECTORS

| SERVER APPARATUS 10-1 | | | SERVER APPARATUS 10-2 | | | SERVER APPARATUS 10-3 | | | SERVER APPARATUS 10-4 | | | SERVER APPARATUS 10-5 | | |
|---|---|---|---|---|---|---|---|---|---|---|---|---|---|---|
| CURRENT ROUND NUMBER 6 | | STATE | CURRENT ROUND NUMBER 6 | | STATE | CURRENT ROUND NUMBER 6 | | STATE | CURRENT ROUND NUMBER 6 | | STATE | CURRENT ROUND NUMBER 6 | | STATE |
| SELF CANDIDATE | A | SECOND STATE | SELF CANDIDATE | A | SECOND STATE | SELF CANDIDATE | A | FIRST STATE | SELF CANDIDATE | B | FIRST STATE | SELF CANDIDATE | A | SECOND STATE |
| OTHER CANDIDATE | | UNDETERMINED | OTHER CANDIDATE | | UNDETERMINED | OTHER CANDIDATE | | UNDETERMINED | OTHER CANDIDATE | | UNDETERMINED | OTHER CANDIDATE | | UNDETERMINED |
| | | UNDETERMINED | | | UNDETERMINED | | | UNDETERMINED | | | UNDETERMINED | | | UNDETERMINED |
| | | UNDETERMINED | | | UNDETERMINED | | | UNDETERMINED | | | UNDETERMINED | | | UNDETERMINED |
| | | UNDETERMINED | | | UNDETERMINED | | | UNDETERMINED | | | UNDETERMINED | | | UNDETERMINED |

FIG.15

Server Apparatus 10-1, Current Round Number 6

| | Candidate | State |
|---|---|---|
| Self Candidate | A | SECOND STATE |
| Other Candidate | A | SECOND STATE |
| | A | FIRST STATE |
| | B | FIRST STATE |
| | A | SECOND STATE |

Server Apparatus 10-2, Current Round Number 6

| | Candidate | State |
|---|---|---|
| Self Candidate | A | SECOND STATE |
| Other Candidate | A | SECOND STATE |
| | A | FIRST STATE |
| | A | SECOND STATE |
| | | UNDETERMINED |

Server Apparatus 10-3, Current Round Number 6

| | Candidate | State |
|---|---|---|
| Self Candidate | A | FIRST STATE |
| Other Candidate | A | SECOND STATE |
| | A | SECOND STATE |
| | A | SECOND STATE |
| | | UNDETERMINED |

Server Apparatus 10-4, Current Round Number 6

| | Candidate | State |
|---|---|---|
| Self Candidate | B | FIRST STATE |
| Other Candidate | A | SECOND STATE |
| | A | SECOND STATE |
| | A | SECOND STATE |
| | | UNDETERMINED |

Server Apparatus 10-5, Current Round Number 6

| | Candidate | State |
|---|---|---|
| Self Candidate | A | SECOND STATE |
| Other Candidate | A | STATE |
| | B | FIRST STATE |
| | | UNDETERMINED |
| | | UNDETERMINED |

→ AFTER PROCESSES WITH CHANGERS

Server Apparatus 10-1, Current Round Number 1

| | Candidate | State |
|---|---|---|
| Self Candidate | | UNDETERMINED |
| Other Candidate | | UNDETERMINED |
| | | UNDETERMINED |
| | | UNDETERMINED |
| | | UNDETERMINED |

Server Apparatus 10-2, Current Round Number 1

| | Candidate | State |
|---|---|---|
| Self Candidate | | UNDETERMINED |
| Other Candidate | | UNDETERMINED |
| | | UNDETERMINED |
| | | UNDETERMINED |
| | | UNDETERMINED |

Server Apparatus 10-3, Current Round Number 1

| | Candidate | State |
|---|---|---|
| Self Candidate | | UNDETERMINED |
| Other Candidate | | UNDETERMINED |
| | | UNDETERMINED |
| | | UNDETERMINED |
| | | UNDETERMINED |

Server Apparatus 10-4, Current Round Number 1

| | Candidate | State |
|---|---|---|
| Self Candidate | | UNDETERMINED |
| Other Candidate | | UNDETERMINED |
| | | UNDETERMINED |
| | | UNDETERMINED |
| | | UNDETERMINED |

Server Apparatus 10-5, Current Round Number 7

| | Candidate | State |
|---|---|---|
| Self Candidate | A | FIRST STATE |
| Other Candidate | | UNDETERMINED |
| | | UNDETERMINED |
| | | UNDETERMINED |
| | | UNDETERMINED |

INFORMATION PROCESSING SYSTEM, SERVER APPARATUS, INFORMATION PROCESSING METHOD, AND COMPUTER PROGRAM PRODUCT

CROSS-REFERENCE TO RELATED APPLICATION

This application is a continuation of PCT international application Ser. No. PCT/JP2013/073847 filed on Sep. 4, 2013, the entire contents of which are incorporated herein by reference.

FIELD

Embodiments described herein relate generally to an information processing system, a server apparatus, an information processing method, and a computer program product.

BACKGROUND

Distributed systems formed a plurality of computers have widely been used in various fields. The distributed systems exist in a wide variety of forms. A cluster system in which all the computers behave as a computer can be cited as an exemplary distributed system. Cloud services that have rapidly spread are also provided with the distributed systems. For example, a distributed key-value store for storing the information by giving a name (key) to a value is used in the cloud service.

The same information is stored in a plurality of computers in order to improve fault tolerance. This prevents loss of information even when the data loss occurs in some of the computers. A technical problem to multiplex the information is how to maintain the consistency of the multiplexed information when the information is changed. The contents or results of the change are notified to each computer so that each computer applies the change. This method can maintain the consistency.

To perform this method, note that it is necessary to perform changes in the same order in each computer when the changes that are not commutative are simultaneously performed. For example, a change A to add 1,000 yen to a deposit balance and a change B to add 1% of the deposit balance to the deposit balance occur at almost the same time. The changes applied in different orders have the final results that are not identical. In other words, it is necessary to determine the order of the changes A and B and make all of the multiplexed computers perform the changes in the same order. Similarly, in a method in which the results from changes are notified to each computer, the order of the changes needs being the same in the computers.

To maintain the same order of the changes, it is necessary to put order numbers to all of the changes. If the request sources of the changes are unified, the request sources can put the order numbers. In general, however, the request sources are not necessarily unified. To determine the order of the changes when the request sources are not unified, a method is disclosed in ZooKeeper: A Distributed Coordination Service for Distributed Applications <URL: http://zookeeper.apache.org/doc/current/zookeeperOver.html>. According to the disclosed method, the change requests are temporarily collected in a computer referred to as a leader (or a master) so that the order of the change requests is determined.

However, when the master computer breaks down and stops in the method in which the change requests are collected in the master computer and the order of the change requests is determined, it is difficult to determine the order of the change requests until another computer is selected as the master computer. This halts the multiplexing process.

BRIEF DESCRIPTION OF THE DRAWINGS

FIG. 3 is a view of exemplary history data according to the embodiment;

FIG. 9 is a view for specifically describing an information processing method according to the embodiment;

FIG. 11 is a view for specifically describing the information processing method according to the embodiment;

FIG. 13 is a view for specifically describing the information processing method according to the embodiment;

FIG. 14 is a view for specifically describing the information processing method according to the embodiment;

FIG. 15 is a view for specifically describing the information processing method according to the embodiment;

DETAILED DESCRIPTION

According to an embodiment, an information processing system includes one or more client apparatuses and N server apparatuses configured to store data, where N is an integer larger than or equal to three. Each client apparatus includes a transmitter configured to transmit a request indicating changes of the data to any one of the server apparatuses. Each server apparatus includes a first storage, a receiver, a generator, a selector, a transmitter, and a changer. The first storage is configured to store the data and history data in which the request is linked to an order number that indicates an order in which the data is changed in accordance with the changes in the request. The receiver is configured to receive the request from the client apparatus, and receive a data candidate. The data candidate includes a current order number that indicates an unused order number among the order numbers, the request that is a candidate to be registered in the history data with the current order number, and a state of the request from one or more server apparatuses.

The generator is configured to set a state of the request received from the client apparatus to a first state, and generate a data candidate including the request in the first state, and the current order number. The selector is configured to, when the number of requests indicating identical changes among the requests of the data candidates is larger than a first threshold, select one of the requests indicating the identical changes, and set a state of the selected request to a second state. The transmitter is configured to transmit the data candidate including the selected request to one or more server apparatuses. The changer is configured to, when the number of requests in the second state among the requests of the data candidates is larger than a second threshold, update the history data and change the data by using one of the data candidates including the requests in the second state.

The information processing system, server apparatus, information processing method, and program according to the embodiment will be described hereinafter with reference to the appended drawings.

Figure 1:
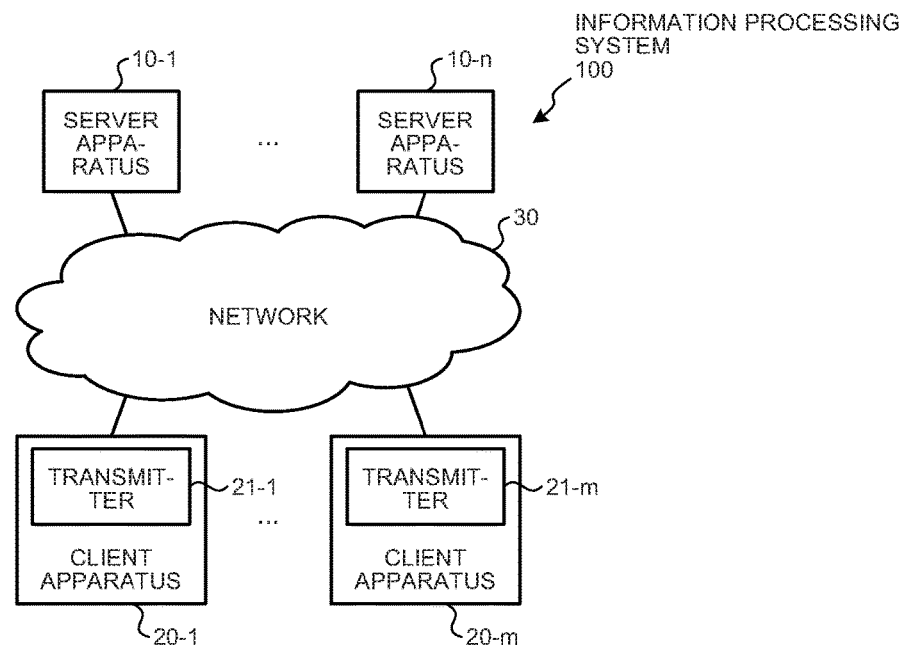
FIG. 1 is a view of an exemplary configuration of an information processing system according to an embodiment.

FIG. 1 is a view of an exemplary configuration of the information processing system according to the embodiment. An information processing system 100 according to the present embodiment includes a server apparatus 10-1 . . . , a server apparatus 10-*n* (n is an integer larger than and equal to three), a client apparatus 20-1 . . . , a client apparatus 20-*m* (m is an integer larger than and equal to one), and a network 30. When it is unnecessary to distinguish the server apparatus 10-1 . . . , the server apparatus 10-*n* from each other, the server apparatus 10-1 . . . , the server apparatus 10-*n* are referred to merely as a server apparatus 10. Similarly, when it is unnecessary to distinguish the client apparatus 20-1 . . . , a client apparatus 20-*m* from each other, the client apparatus 20-1 . . . , a client apparatus 20-*m* are referred to merely as a client apparatus 20.

The server apparatus 10 and the client apparatus 20 are connected to each other via a network 30 so that the server apparatus 10 and the client apparatus 20 can communicate with each other. Note that the communication between the server apparatus 10 and the client apparatus 20 can be wired, or wireless, or can be the combination of them. The server apparatus 10-1 . . . , and the server apparatus 10-*n* store data. The client apparatus 20 includes a transmitter 21. The transmitter 21 transmits a request indicating the changes of data in the server apparatus 10 to an arbitrary server apparatus 10.

Figure 2:
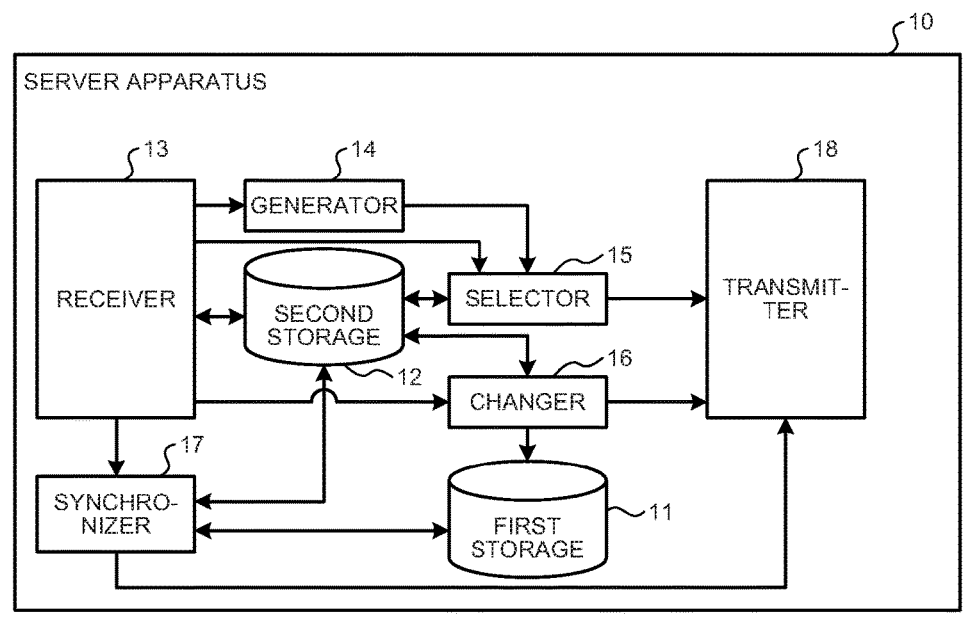
FIG. 2 is a view of an exemplary configuration of a server apparatus according to the embodiment.

FIG. 2 is a view of an exemplary configuration of the server apparatus 10 according to the embodiment. The server apparatus 10 according to the present embodiment includes a first storage 11, a second storage 12, a receiver 13, a generator 14, a selector 15, a changer 16, a synchronizer 17, and a transmitter 18.

The first storage 11 stores data and history data. The data is, for example, the data on a database. The history data is a journal of the database. The server apparatus 10 can store arbitrary data items in the first storage 11.

FIG. 3 is a view of exemplary history data according to the embodiment. The history data is the information in which the order numbers are linked to the requests. The order number indicates the order in which the data in the first storage 11 is changed in accordance with the changes indicated in the request. The initial value of the order number according to the present embodiment is set at one. Hereinafter, the order number that is not used and is not linked to a request is referred to as a current order number. An order number S is the current order number in the example of FIG. 3.

With reference to FIG. 2 again, the second storage 12 temporarily stores the data candidate and current round number of each server apparatus 10. The data candidate includes the current order number, a request that is a candidate for being registered in the history data with the current order number, the state of the request, a round number, and a server identifier. The state of the request included in the data candidate is a first state or a second state. The state of the request is the information used in a process for determining the request to be linked to the current order number. The round number is a number used in a process for determining the request to be linked to the current order number. The process for determining the request to be linked to the current order number will be described in detail below with reference to flowcharts in FIGS. 4 to 8. The server identifier is the identification information to identify each server apparatus 10. For example, the server identifier is a server numbers 1 to N allotted to the server apparatuses 10. Using the server identifier included in a data candidate can identify the server apparatus 10 that transmits the data candidate.

The current round number is the latest round number. The initial value of the current round number according to the present embodiment is set at one. The current round number and data candidate in the second storage 12 are updated with the selector 15 and the changer 16.

The receiver 13 receives a request from the client apparatus 20, and data candidates from one ore more server apparatuses 10. The receiver 13 transmits the request received from the client apparatus 20 to the generator 14 when the current round number is one.

The receiver 13 temporarily stores the received data candidates in the second storage 12. If the data candidate of its own server apparatus 10 in the current round is not determined at that time, the receiver 13 determines the received data candidate as the data candidate of its own server apparatus 10 in the current round and stores the data candidate in the second storage 12. The receiver 13 reads the current round number from the second storage 12, and transmits a data candidate reception notification indicating that the receiver 13 receives the data candidates from another server apparatus 10 to the selector 15 or the changer 16 in accordance with the current round number. Specifically, the receiver 13 transmits the data candidate reception notification to the selector 15 when the current round number is an odd number. The receiver 13 transmits the data candidate reception notification to the changer 16 when the current round number is an even number.

The receiver 13 further receives the current order number from another server apparatus 10 when the server apparatus 10 updates the history data. The receiver 13 transmits the received current order number to the synchronizer 17, and requests the synchronizer 17 to perform a history data synchronizing process triggered by the reception of the current order number. The history data synchronizing process triggered by the reception of the current order number will be described below.

When the current order number of the received data candidate is larger than the current order number of the history data, the receiver 13 requests the synchronizer 17 to perform a history data synchronizing process triggered by the reception of the current order number. When the round number of the received data candidate is larger than the current round number, the receiver 13 requests the synchronizer 17 to perform a process for synchronizing the current round number before the process described in the paragraph 0019. These synchronizing processes make all of the order numbers and round numbers of data candidates included in the second storage 12 identical. The history data synchronizing process and round number synchronizing process triggered by the reception of a data candidate will be described below.

By performing the processes with the receiver 13 and the synchronizer 17 described below, the server apparatus 10 determines whether the process for determining the request to be linked to the current order number in the server apparatus 10 lags behind the processes in another server apparatus 10. When the process delays, the server apparatus 10 synchronizes the process with the process in another server apparatus 10. The synchronization will be described in detail with reference to the flowchart in FIG. 5.

The generator 14 sets the state of the request received from the client apparatus 20 via the receiver 13 to the first state when the current round number is one (the initial value). The generator 14 generates a data candidate that includes the request in the first state, the current order number of the history data, and the round number of which value is one. The generator 14 transmits the data candidate to the selector 15.

The selector 15 receives the data candidate from the generator 14 when the current round number is one (the initial value). The selector 15 receives the data candidate reception notification from the receiver 13 when the current round number is an odd number. When receiving the data candidate reception notification, the selector 15 reads the data candidate from the second storage 12.

When the number of requests indicating the same changes among the requests of the data candidates read from the second storage 12 is larger than a threshold, the selector 15 selects one of the requests indicating the same changes. Note that the threshold is n/2 in the present embodiment. In other words, the threshold is set to a value half the number of server apparatuses 10 in the information processing system 100. However, the threshold is not limited to n/2, and can be an arbitrary value larger than n/2. The selector 15 sets the state of the selected request to the second state, and increases the round number of the data candidate including the selected request by one. The selector 15 deletes the data candidates including the requests that are not selected from the second storage 12, and transmits the data candidate including the selected request via the transmitter 18 to one or more server apparatuses 10. The selector 15 increases the current round number in the second storage 12 by one.

Alternatively, when there is a request indicating different changes among the requests of the data candidates read from the second storage 12, the selector 15 selects one of the data candidates. Specifically, the selector 15 reads the data candidates from the second storage 12, and selects one of the data candidates at random. Note that a method for selecting one of the data candidates with the selector 15 is not limited to the method in which one of the data candidates is selected at random, and can be another method. The selector 15 increases the round number of the selected data candidate by one. The selector 15 deletes the data candidates that are not selected from the second storage 12. The selector 15 determines the selected data candidate as its own data candidate in the round, and stores the selected data candidate in the second storage 12. The selector 15 transmits the selected data candidate via the transmitter 18 to one or more server apparatuses 10. The selector 15 increases the current round number of the second storage 12 by one.

Note that the server apparatus 10 to which the selector 15 transmits the data candidate is determined with a predetermined method. The predetermined method is, for example, a method in which a predetermined number of server apparatuses 10 that are to be the destination are selected at random, or a method in which all of the other server apparatuses 10 are the destination.

The changer 16 receives the data candidate reception notification from the receiver 13 when the current round number is an even number. When receiving the data candidate reception notification, the changer 16 reads the data candidate from the second storage 12.

When the number of requests in the second state among the requests of the data candidates read from the second storage 12 is larger than the threshold, the changer 16 updates the history data and changes the data using one of the data candidates including the requests in the second state. The changer 16 returns the current round number of the second storage 12 to one (the initial value). The changer 16 increases the current order number in the first storage 11 by one. The changer 16 transmits the current order number increased by one to the other server apparatuses 10. This notifies the order number that is newly used to the other server apparatuses 10.

When there is are data candidates including the requests in the first state and there are data candidates including the requests in the second state among the data candidates read from the second storage 12, the changer 16 selects one of the data candidates including the requests in the second state and sets the state of the request of the selected data candidate to the second state. The changer 16 increases the round number of the selected data candidate by one. The changer 16 deletes the data candidates that are not selected from the second storage 12. The changer 16 determines the selected data candidate as its own data candidate in the increased round, and stores the selected data candidate in the second storage 12. The changer 16 transmits the selected data candidate via the transmitter 18 to one or more server apparatuses 10. The selector 15 increases the current round number in the second storage 12 by one.

When the number of requests in the first state among the requests of the data candidates read from the second storage 12 is larger than the threshold, the changer 16 selects one of the data candidates. For example, the changer 16 selects one of the data candidates at random. Note that the method for selecting one of the data candidates with the changer 16 is not limited to the method in which one of the data candidates is selected at random, and can be another method. The changer 16 increases the round number of the selected data candidate by one. The changer 16 deletes the data candidates that are not selected from the second storage 12. The changer 16 determines the selected data candidate as its own data candidate in the increased round, and stores the selected data candidate in the second storage 12. The changer 16 transmits the selected data candidate via the transmitter 18 to one or more server apparatuses 10. The selector 15 increases the current round number in the second storage 12 by one.

When the current order number of the data candidate that the receiver 13 receives from another server apparatus 10 is larger than the current order number in the history data, the synchronizer 17 deletes the data candidates in the second storage 12 and transmits a request for transmitting the history data to the server apparatus 10 that transmits the current order number via the transmitter 18 (the history data synchronizing process triggered by the reception of the data candidate).

When the receiver 13 receives a data candidate and the round number of the received data candidate is larger than the current round number in the second storage 12, the synchronizer 17 deletes the data candidates in the second storage 12. Then, the synchronizer 17 stores the received data candidate in the second storage 12, and sets the current round number to the round number of the received data candidate (the round number synchronizing process).

When the synchronizer 17 receives the current order number via the receiver 13 from another server apparatus 10 and the current order number received from the server apparatus 10 is larger than the current order number in the history data, the synchronizer 17 deletes the data candidates in the second storage 12 and transmits a request for transmitting the history data to the server apparatus 10 that transmits the current order number via the transmitter 18 (the history data synchronizing process triggered by the reception of the current order number).

The server apparatus 10 can update its own history data to the latest state by receiving the latest history data from another server apparatus 10 in the history data synchronizing process with the synchronizer 17.

The transmitter 18 includes a server identifier used to identify its own server apparatus 10 in the data candidate received from the selector 15 or the changer 16, and transmits the data candidate to one or more server apparatuses 10. Alternatively, when receiving an order number from the changer 16, the transmitter 18 transmits the order number to all of the other server apparatuses 10. When receiving a request for transmitting the history data from the synchronizer 17, the transmitter 18 transmits the request for transmitting the history data to the server apparatus 10 to which the synchronizer 17 is to send the request.

Figure 4:
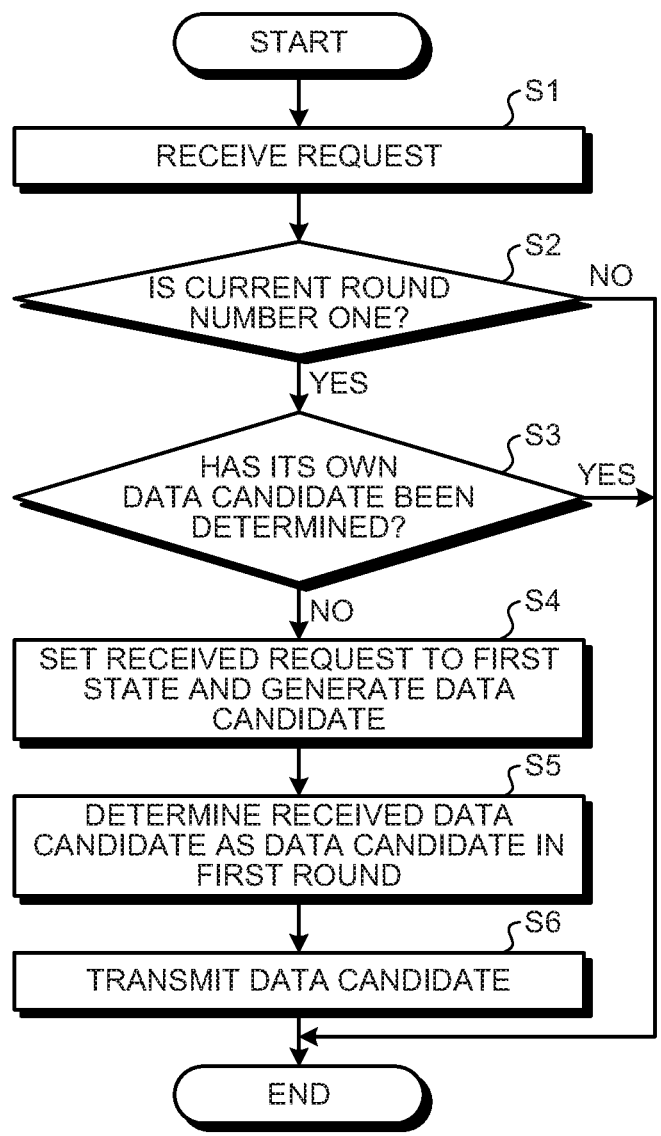
FIG. 4 is a flowchart of a process when the server apparatus according to the embodiment receives a request.

The information processing method with the information processing system 100 in the present embodiment will be described next with reference to a flowchart. FIG. 4 is the flowchart of a process when the server apparatus 10 according to the embodiment receives a request. The receiver 13 receives a request from the client apparatus 20 (step S1) The receiver 13 reads the current round number from the second storage 12 to determine whether the current round number is one (the initial value) (step S2). When the current round number is one (step S2, Yes), the process with the receiver 13 goes to step S3. When the current round number is not one (step S2, No), the receiver 13 terminates the process.

The receiver 13 determines whether its own data candidate in the first round is determined (step S3). When its own data candidate in the first round is determined (step S3, Yes), the receiver 13 terminates the process. When its own data candidate in the first round is not determined (step S3, No), the receiver 13 transmits the received request to the generator 14. The generator 14 sets the state of the request received from the receiver 13 to the first state. The generator 14 generates a data candidate including the request set to the first state, the current order number in the first storage 11, and the round number of which value is one (the initial value) (step S4). The generator 14 transmits the generated data candidate to the selector 15. The selector 15 determines the data candidate received from the generator 14 as its own data candidate in the first round, and stores the data candidate in the second storage 12 (step S5). The selector 15 transmits the determined data candidate via the transmitter 18 to one or more server apparatuses 10 (step S6). Note that the transmitter 18 includes a server identifier used to identify its own server apparatus 10 in the data candidate, and transmits the data candidate to one or more server apparatuses 10.

Figure 5:
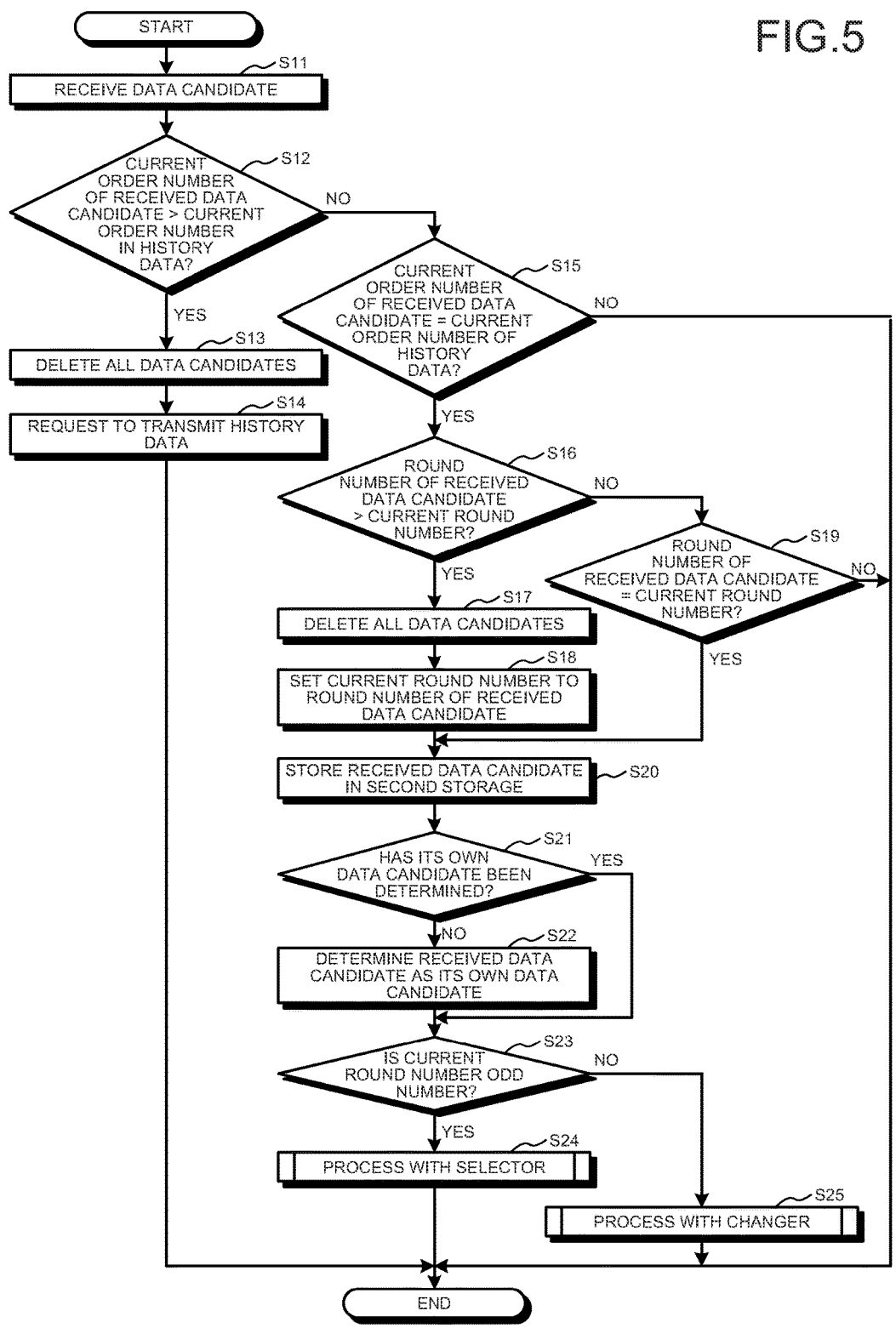
FIG. 5 is a flowchart of a process when the server apparatus according to the embodiment receives a data candidate.

FIG. 5 is a flowchart of a process when the server apparatus 10 according to the embodiment receives a data candidate. The receiver 13 receives a data candidate from another server apparatus 10 (step S11). The receiver 13 determines whether the current order number included in the received data candidate is larger than the current order number in the history data (step S12).

When the current order number included in the received data candidate is larger than the current order number in the history data (step S12, Yes), the receiver 13 requests the synchronizer 17 to perform a history data synchronizing process. When receiving the request for the history data synchronizing process from the receiver 13, the synchronizer 17 deletes all of the data candidates in the second storage 12 (step S13), requests the server apparatus 10 that transmits the data candidate including the current order number to transmit the history data (step S14), and then terminates the process for receiving the data candidate.

When the current order number included in the received data candidate is smaller than or equal to the current order number of the history data (step S12, No), the process with the receiver 13 goes to step S15.

The receiver 13 determines whether the current order number of the received data candidate matches the current order number in the history data (step S15). When the current order number of the received data candidate matches the current order number of the history data (step S15, Yes), the process with the receiver 13 goes to step S16. When the current order number of the received data candidate does not match the current order number of the history data (step S15, No), the receiver 13 terminates the process.

The receiver 13 determines whether the round number of the received data candidate is larger than the current round number in the second storage 12 (step S16). When the round number of the received data candidate is larger than the current round number in the second storage 12 (step S16, Yes), the receiver 13 requests the synchronizer 17 to perform a round number synchronizing process. When receiving the request for the round number synchronizing process from the receiver 13, the synchronizer 17 deletes all of the data candidates in the second storage 12 (step S17), and sets the current round number to the round number of the data candidate that the receiver 13 receives (step S18). Next, the process with the receiver 13 goes to step S20.

When the round number of the received data candidate is smaller than or equal to the current round number in the second storage 12 (step S16, No), the process with the receiver 13 goes to step S19.

The receiver 13 determines the round number of the received data candidate matches the current round number in the second storage 12 (step S19). When the round number of the received data candidate matches the current round number in the second storage 12 (step S19, Yes), the process with the receiver 13 goes to step S20. When the round number of the received data candidate does not match the current round number in the second storage 12 (step S19, No), the process is terminated.

The receiver 13 stores the received data candidate in the second storage 12 (step S20). Next, the receiver 13 determines whether its own data candidate in the current round is determined (step S21). When its own data candidate in the current round is determined (step S21, Yes), the receiver 13 determines the received data candidate as its own data candidate, and stores the data candidate in the second storage 12 (step S22). Next, the receiver 13 determines whether the current round number is an odd number (step S23). When the current round number is an odd number (step S23, Yes), the receiver 13 transmits a data candidate reception notification to the selector 15 and the process moves to the process with the selector 15 (step S24). When the current round number is an even number (step S23, No), the receiver 13 transmits a data candidate reception notification to the changer 16 and the process moves to the process with the changer 16 (step S25).

Figure 6:
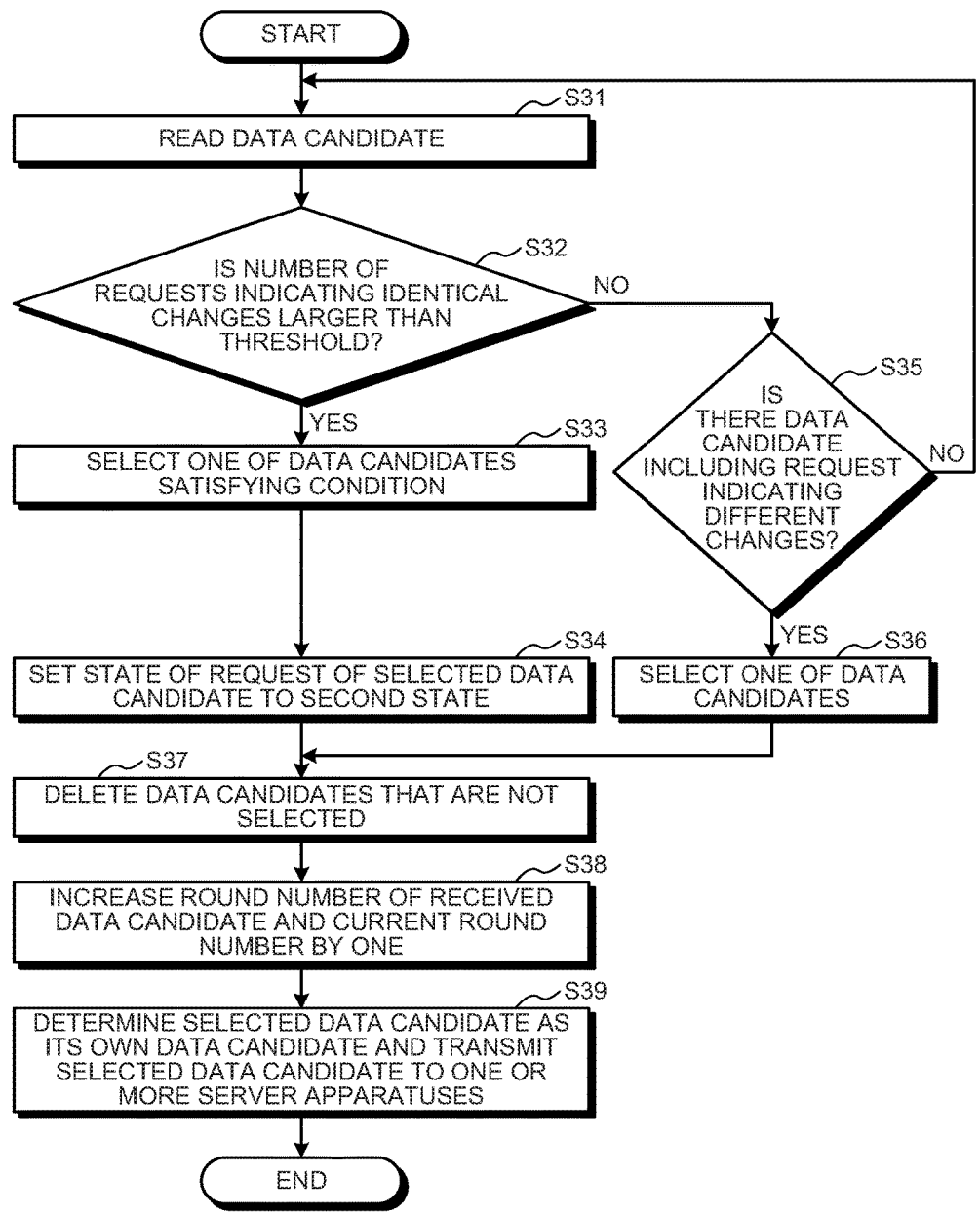
FIG. 6 is a flowchart of a process with a selector in the server apparatus according to the embodiment.

FIG. 6 is a flowchart of the process with the selector 15 in the server apparatus 10 according to the embodiment. When receiving a data candidate reception notification from the receiver 13, the selector 15 reads the data candidate from the second storage 12 (step S31). Note that the selector 15 can read the data candidate from the second storage 12 every time receiving a data candidate reception notification, or can read the data candidates from the second storage 12 at a time in response to a plurality of data candidate reception notifications. When the selector 15 completes the process for reading the data candidate from the second storage 12, the process goes to step S32. Note that an arbitrary method can be used as the method for determining the completion of the reading process. For example, there is a method in which the data candidates are read by the number of data candidate reception notifications received while a predetermined period elapses from the reception of the first data candidate reception notification, or a method in which the reading process is terminated when the data candidates are read by a number determined based on the number of server apparatuses 10 in the information processing system 100.

The selector 15 determines whether the number of requests indicating the same changes among the requests of the data candidates read from the second storage 12 is larger than the threshold (step S32). When the number of requests indicating the same changes is larger than the threshold (step S32, Yes), the selector 15 selects one of the data candidates that satisfy the condition in step S32 (step S33), and sets the state of the request of the selected data candidate to the second state (step S34). Next, the process with the selector 15 goes to step S37.

When the number of requests indicating the same changes is smaller than or equal to the threshold (step S32, No), the selector 15 determines whether there is a request indicating different changes among the requests of the data candidates read from the second storage 12 (step S35). When there is no request indicating different changes (step S35, No), the process goes back to step S31. When there is a request indicating different changes (step S35, Yes), the selector 15 selects one of the data candidates read from the second storage 12 (step S36), and the process goes to step S37.

The selector 15 deletes the data candidates that are not selected from the second storage 12 (step S37). The selector 15 increases the round number of the selected data candidate by one, and increases the current round number in the second storage 12 by one (step S38). The selector 15 determines the selected data candidate as its own data candidate in the increased round, and stores the data candidate in the second storage 12. The selector 15 transmits the data candidate via the transmitter 18 to one or more server apparatuses 10 (step S39). Note that the transmitter 18 includes a server identifier used to identify its own server apparatus 10 in the data candidate, and transmits the data candidate to one or more server apparatuses 10.

Figure 7:
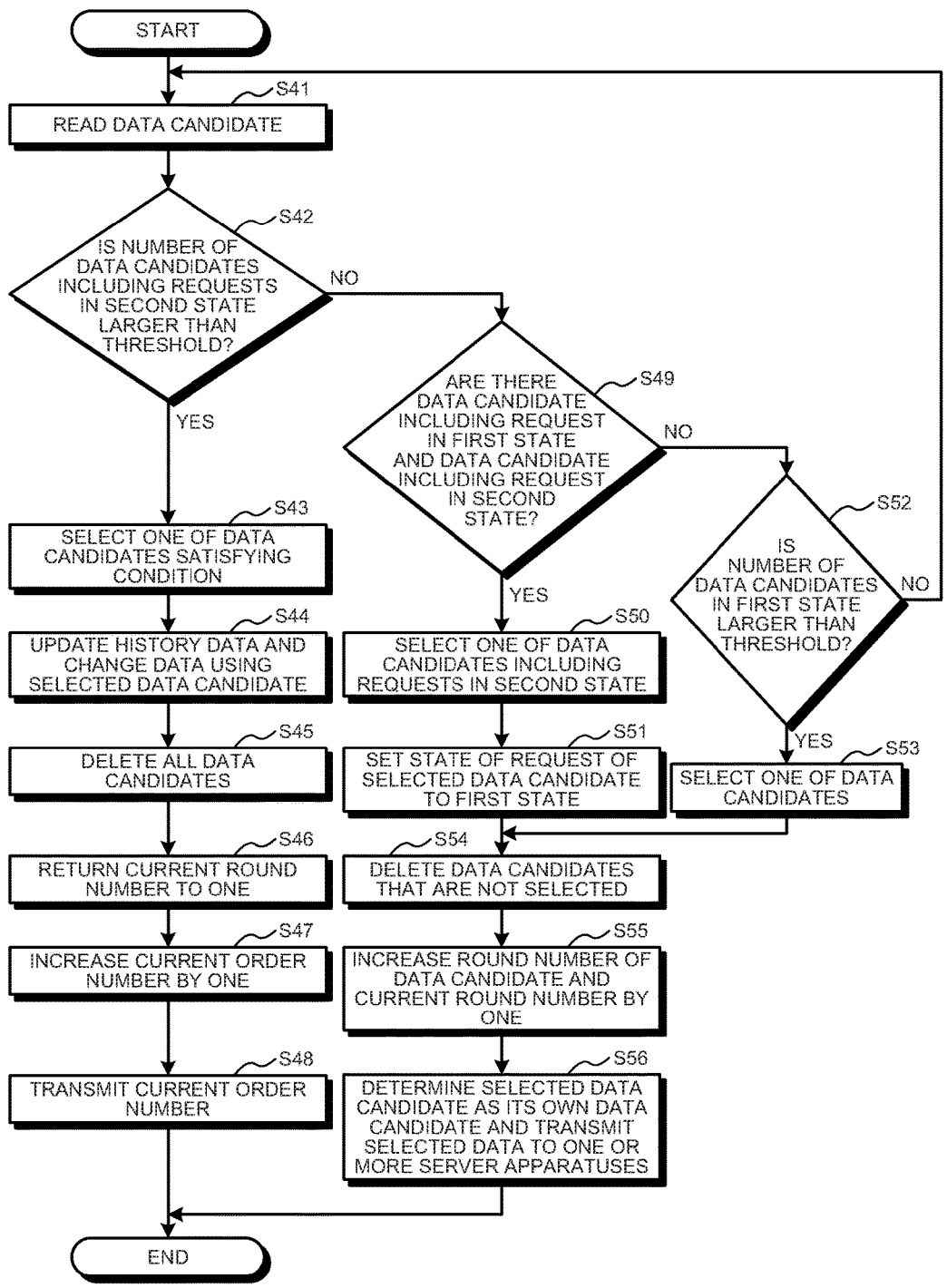
FIG. 7 is a flowchart of a process with a changer in the server apparatus according to the embodiment.

FIG. 7 is a flowchart of the process with the changer 16 in the server apparatus 10 according to the embodiment. When receiving the data candidate reception notification from the receiver 13, the changer 16 reads the data candidate from the second storage 12 (step S41). Note that the details of the reading process in step S41 are similar to the process in step S31, and thus the description is omitted.

The changer 16 determines whether the number of data candidates of which requests are in the second state is larger than the threshold (step S42). When the number of data candidates of which requests are in the second state is smaller than or equal to the threshold (step S42, No), the process with the changer 16 goes to step S49.

When the number of data candidates of which requests are in the second state is larger than the threshold (step S42, Yes), the changer 16 selects one of the data candidates that satisfy the condition in step S42 (step S43). Next, the changer 16 updates the history data in the first storage 11 and changes the data in the first storage 11 using the selected data candidate (step S44). Next, the changer 16 deletes all of the data candidates in the second storage 12 (step S45). Next, the changer 16 returns the current round number in the second storage 12 to one (the initial value) (step S46). Next, the changer 16 increases the current order number of the history data in the first storage 11 by one (step S47). Next, the changer 16 transmits the current order number to the other server apparatuses 10 (step S48), and the process is terminated.

The changer 16 determines whether there are both of the data candidates including requests in the first state and the data candidates including requests in the second state among the data candidates read from the second storage 12 (step S49). When there are both of the data candidates (step S49, Yes), the changer 16 selects one of the data candidates including requests in the second state (step S50), and sets the state of the request of the selected data candidate to the first state (step S51). Next, the process with the changer 16 goes to step S54.

When there is neither of the data candidates (step S49, No), the changer 16 determines whether the number of data candidates of which requests are in the first state is larger than the threshold (step S52). When the number of data candidates of which requests are in the first state is smaller than or equal to the threshold (step S52, No), the process with the changer 16 goes back to step S41. When the number of data candidates of which requests are in the first state is larger than the threshold (step S52, Yes), the process with the changer 16 goes to step S53. The changer 16 selects one of the data candidates read from the second storage 12 (step S53). Next, the process with the changer 16 goes to step S54.

The changer 16 deletes the data candidates that are not selected from the second storage 12 (step S54). The changer 16 increases the round number of the selected data candidate by one, and increases the current round number in the second storage 12 by one (step S55). The changer 16 transmits the selected data candidate via the transmitter 18 to one or more server apparatuses 10 (step S56). Note that the transmitter 18 includes a server identifier used to identify its own server apparatus 10 in the data candidate, and transmits the data candidate to one or more server apparatuses 10.

Figure 8:
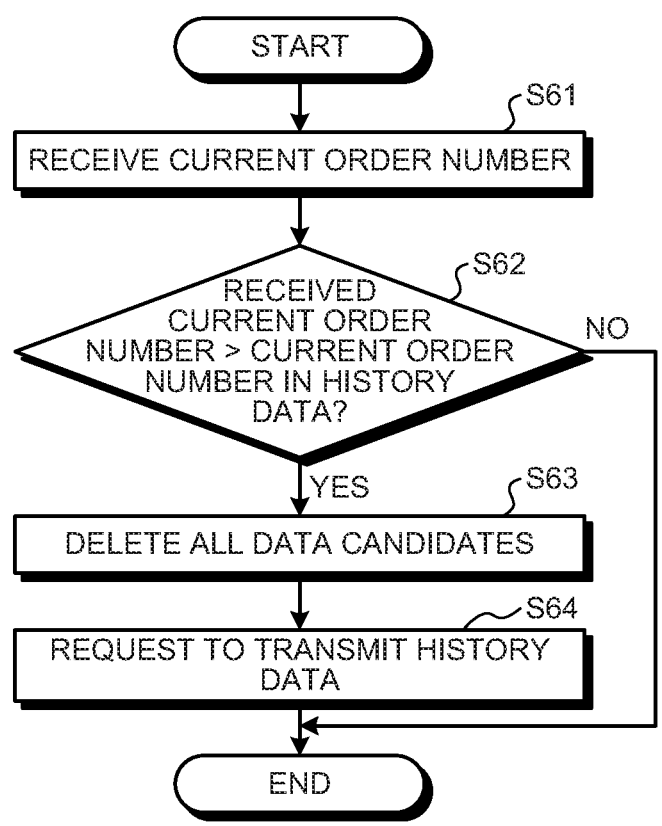
FIG. 8 is a flowchart of a process when the server apparatus according to the embodiment receives a current order number.

FIG. 8 is a flowchart of a process when the server apparatus 10 according to the embodiment receives a current order number. When another server apparatus 10 updates the history data, the receiver 13 receives the current order number from the server apparatus 10 (step S61). The receiver 13 determines whether the received current order number is larger than the current order number of the history data in the first storage 11 (step S62). When the received current order number is smaller than or equal to the current order number of the history data in the first storage 11 (step S62, No), the process is terminated.

When the received current order number is larger than the current order number of the history data in the first storage 11 (step S62, Yes), the receiver 13 requests the synchronizer 17 to perform a process for synchronizing the history data. When receiving the request for the history data synchronizing process from the receiver 13, the synchronizer 17 deletes all of the data candidates in the second storage 12 (step S63), and requests the server apparatus 10 that transmits the data candidate including the current order number to transmit the history data (step S64). By the request, the server apparatus 10 can receive the latest history data from another server apparatus 10, and update its own history data to the latest state.

Next, the information processing method will be described with reference to a specific example. FIGS. 9 to 14 are views for specifically describing the information processing method according to the embodiment. FIGS. 9 to 14 illustrate examples in which the number n of server apparatuses is five. A self candidate indicates its own candidate for each server apparatus 10 (hereinafter, referred to as a "self data candidate"). Other candidates indicate the data candidates received from the other server apparatuses 10 hereinafter, referred to as "other data candidates"). Note that, in the present example, the current order numbers included in the other data candidates match the current order number of its own server apparatus 10. Additionally, in the present example, the transmitter 18 in the server apparatus 10 determines the destinations of the self data candidate, and the number of destinations at random. In other words, the combinations of the self data candidate and the other data candidates are not necessarily the same in all of the server apparatuses 10. Note that, even if the transmitters 18 in the server apparatuses 10 always have the same destinations of the self data candidate and the same number of destinations, the data candidates are not necessarily the same in all of the server apparatuses 10 due to the delay or failure on the network 30. In the present example, the threshold is 5/2 (=2.5).

The upper diagram in FIG. 9 illustrates the second storages 12 of the server apparatuses 10-1 to 10-5 in an initial state. In other words, the upper diagram illustrates the states of the second storages 12 when the current round numbers of the server apparatuses 10-1 to 10-5 are one, and the information processing method is started in the present embodiment. The lower diagram in FIG. 9 illustrates that the receiver 13 of the server apparatus 10-1 receives a request A from the client apparatus 20 and the generator 14 of the server apparatus 10-1 sets the state of the request A to the first state to generate the self data candidate. The lower diagram further illustrates that the receiver 13 of the server apparatus 10-3 receives a request B from the client apparatus 20 and the generator 14 of the server apparatus 10-3 sets the state of the request B to the first state to generate the self data candidate. The lower diagram further illustrates that the receiver 13 of the server apparatus 10-5 receives a request C from the client apparatus 20 and the generator 14 of the server apparatus 10-5 sets the state of the request C to the first state to generate the self data candidate. Meanwhile, the lower diagram illustrates that the server apparatus 10-2 and the server apparatus 10-4 do not receive a request from the client apparatus 20.

Figure 10:
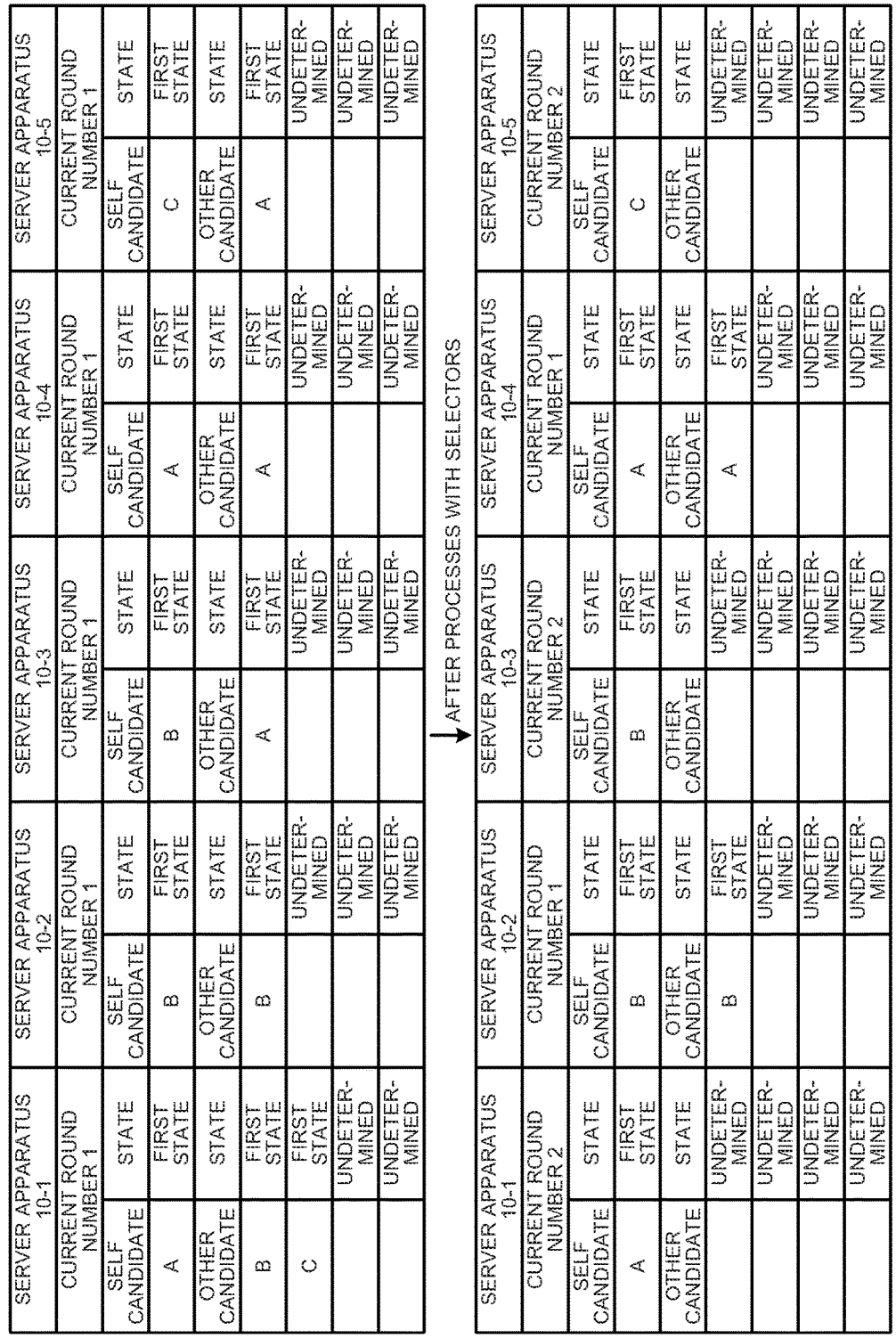
FIG. 10 is a view for specifically describing the information processing method according to the embodiment.

The upper diagram in FIG. 10 illustrates the state of the second storages 12 of the server apparatuses 10-1 to 10-5 after the second storages 12 receive the other data candidates from the other server apparatuses 10 while the second storages 12 are in the states illustrated in the lower diagram of FIG. 9. The second storage 12 of the server apparatus 10-1 updates the state by receiving the request B in the first state and the request C in the first state as the other data candidates from other server apparatuses 10. The second storage 12 of the server apparatus 10-3 updates the state by receiving the request A in the first state as the other data candidate from another server apparatus 10. The second storage 12 of the server apparatus 10-5 updates the state by receiving the request A in the first state as the other data candidate from another server apparatus 10. The second storage 12 of the server apparatus 10-2 updates the state by receiving the request B in the first state from the server apparatus 10-3 as the other data candidate from another server apparatus 10. In particular, the server apparatus 10-2, which has not determined the self data candidate, determines the request B as the self data candidate. The second storage 12 of the server apparatus 10-4 updates the state by receiving the request A in the first state as the other data candidate from the server apparatus 10-1 as the other data candidate from another server apparatus 10. In particular, the server apparatus 10-4, which has not determined the self data candidate, determines the request A as the self data candidate.

The lower diagram of FIG. 10 illustrates the states after the processes with the selectors 15. The selector 15 of the server apparatus 10-1 selects a data candidate (A) at random (determines the data candidate (A) as the self data candidate) because the changes in the requests (A, B, and C) of the data candidates are different from each other. Next, the selector 15 of the server apparatus 10-1 deletes the data candidates (B and C) that are not selected. Next, the selector 15 of the server apparatus 10-1 increases the round number of the self data candidate by one while increasing the current round number by one. The selector 15 of the server apparatus 10-1 transmits the self data candidate via the transmitter 18 to one or more server apparatuses 10. Note that the server apparatus 10-3 and the server apparatus 10-5 operate similarly to the server apparatus 10-1. The server apparatus 10-2 and the server apparatus 10-4 do not have data candidates of which requests indicating difference changes. Thus, the process does not go to the process for selecting a data candidate and the server apparatus 10-2, and the server apparatus 10-4 wait to receive a data candidate (goes back to the process for reading the data candidate).

The upper diagram in FIG. 11 illustrates the state of the second storages 12 of the server apparatuses 10-1 to 10-5 after the second storages 12 receive the other data candidates from one or more server apparatuses 10 while the second storages 12 are in the states illustrated in the lower diagram of FIG. 10. The second storage 12 of the server apparatus 10-2 updates the current round number from one to two by receiving the requests B and C in the first state from other server apparatuses 10 as the other data candidates (by further receiving the request C when the second storage 12 is in the state illustrated in the lower diagram of FIG. 10). This is because the round number of two included in the other data candidate > the current round number of one in the second storage 12 holds when the receiver 13 of the server apparatus 10-2 compares the current round number of one with the round number of two included in the other data candidate, and the current round number is updated to two. The server apparatus 10-2, which has not determined the self data candidate, determines the request B that the server apparatus 10-2 previously receives as the self data candidate. Note that the server apparatus 10-4 operates in a similar manner.

The lower diagram in FIG. 11 illustrates the states after the processes with the changers 16. The changer 16 of the server apparatus 10-1 selects a data candidate (A) at random (determines the data candidate (A) as the self data candidate) because all of the requests (A, B, and C) of the data candidates are in the first state, and the number of the data candidates is larger than the threshold (2.5). Next, the changer 16 of the server apparatus 10-1 deletes the data candidates (B and C) that are not selected. Next, the changer 16 of the server apparatus 10-1 increases the round number of the self data candidate by one while increasing the current round number by one. The changer 16 of the server apparatus 10-1 transmits the self data candidate via the transmitter 18 to one or more server apparatuses 10. Note that the server apparatuses 10-2 to 10-5 operate similarly to the server apparatus 10-1.

Figure 12:
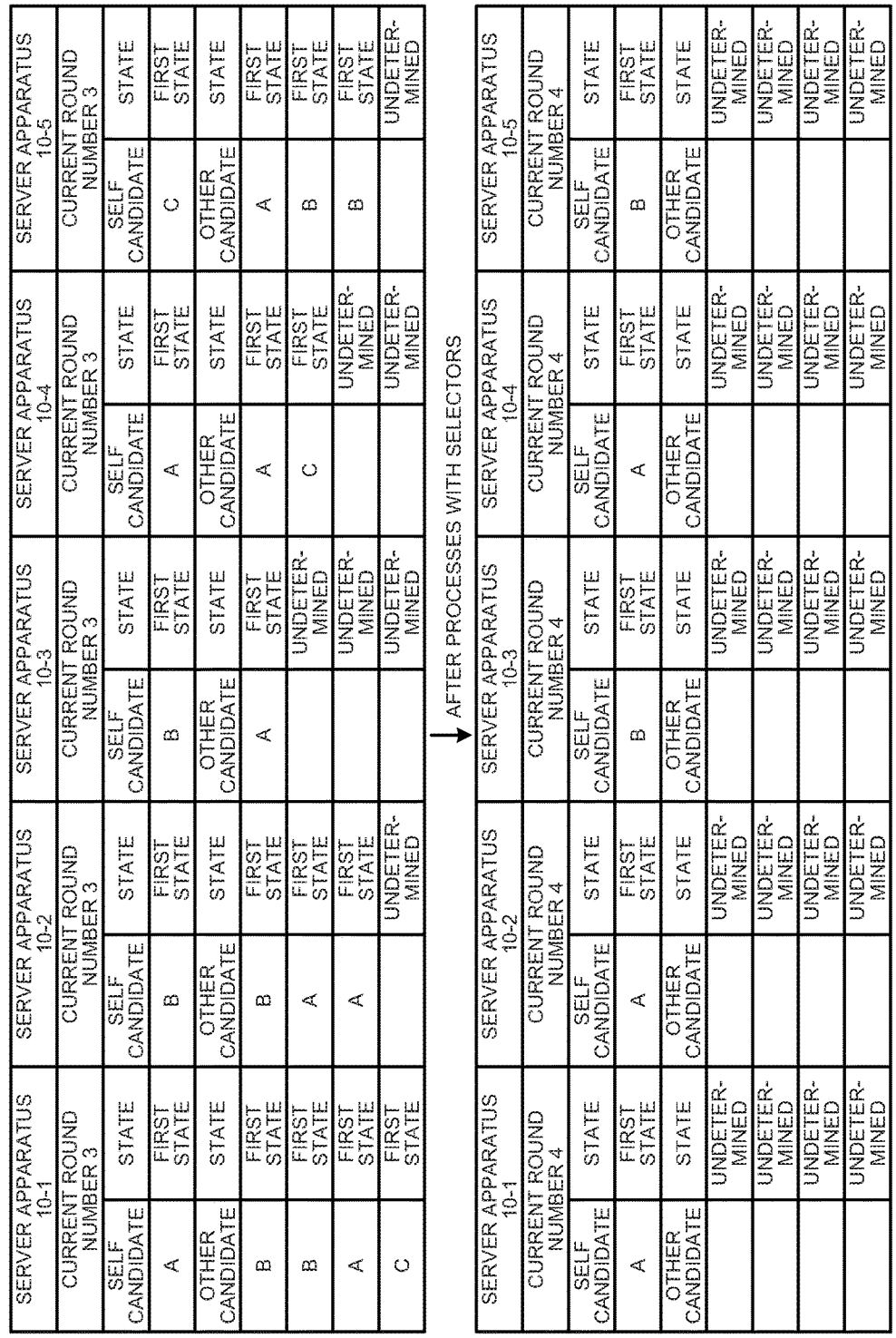
FIG. 12 is a view for specifically describing the information processing method according to the embodiment.

The upper diagram in FIG. 12 illustrates the states of the second storages 12 of the server apparatuses 10-1 to 10-5 after the second storages 12 receive the other data candidates from one or more server apparatuses 10 while the second storages 12 are in the states illustrated in the lower diagram of FIG. 11. The second storage 12 of the server apparatus 10-1 updates the state by receiving the request B in the first state, the request B in the first state, the request A in the first state, and the request C in the first state from the other server apparatuses 10 as the other data candidates. The server apparatuses 10-2 to 10-5 also update the states by receiving the other data candidates from the other server apparatuses 10.

The lower diagram in FIG. 12 illustrates the states after the processes with the selectors 15. The selector 15 of the server apparatus 10-1 selects a data candidate (A) at random (determines the data candidate (A) as the self data candidate) because the number of requests indicating the same changes among the requests (A, B, B, A and C) of the data candidates is less than or equal to the threshold (2.5) and the changes are different from each other. Next, the selector 15 of the server apparatus 10-1 deletes the data candidates (B, B, A, and C) that are not selected. Next, the selector 15 of the server apparatus 10-1 increases the round number of the self data candidate by one while increasing the current round number by one. The selector 15 of the server apparatus 10-1 transmits the self data candidate via the transmitter 18 to one or more server apparatuses 10. Note that the server apparatuses 10-2 to 10-5 operate similarly to the server apparatus 10-1.

The upper diagram in FIG. 13 illustrates the states of the second storages 12 of the server apparatuses 10-1 to 10-5 after the second storages 12 receive the other data candidates from one or more server apparatuses 10 while the second storages 12 are in the states illustrated in the lower diagram of FIG. 12. The second storage 12 of the server apparatus 10-1 updates the state by receiving the request B in the first state, the request B in the first state, and the request A in the first state as the other data candidates from other server apparatuses 10. The server apparatuses 10-2 to 10-5 also update the states by receiving the other data candidates from one or more server apparatuses 10.

The lower diagram in FIG. 13 illustrates the states after the processes with the changers 16. The changer 16 of the server apparatus 10-1 selects a data candidate (A) at random (determines the data candidate (A) as the self data candidate) because all of the requests (A, B, B, and A) are in the first state and the number of data candidates is larger than the threshold (2.5). Next, the changer 16 of the server apparatus 10-1 deletes the data candidates (B, B, and A) that are not selected. Next, the changer 16 of the server apparatus 10-1 increases the round number of the self data candidate by one while increasing the current round number by one. The changer 16 of the server apparatus 10-1 transmits the self data candidate via the transmitter 18 to one or more server apparatuses 10. Note that the server apparatuses 10-2 to 10-5 operate similarly to the server apparatus 10-1.

The upper diagram in FIG. 14 illustrates the states of the second storages 12 of the server apparatuses 10-1 to 10-5 after the second storages 12 receive the other data candidates from one or more server apparatuses 10 while the second storages 12 are in the states illustrated in the lower diagram of FIG. 13. The second storage 12 of the server apparatus 10-1 updates the state by receiving the request A in the first state, the request A in the first state, the request B in the first state, and the request A in the first state as the other data candidates from the other server apparatuses 10. The server apparatuses 10-2 to 10-5 also update the states by receiving the other data candidates from one or more server apparatuses 10.

The lower diagram in FIG. 14 illustrates the states after the processes with the selectors 15. The selector 15 of the server apparatus 10-1 selects a data candidate (A) from the requests (A, A, A, and A) indicating the same changes at random (sets the data candidate (A) as the self data candidate) because the number of requests (A, A, A, and A) indicating the same changes among the requests (A, A, A, B, and A) of the data candidates is larger than the threshold (2.5). The selector 15 of the server apparatus 10-1 sets the state of the selected request to the second state. Next, the selector 15 of the server apparatus 10-1 deletes the data candidates (A, A, B, and A) that are not selected. Next, the selector 15 of the server apparatus 10-1 increases the round number of the self data candidate by one while increasing the current round number by one. The selector 15 of the server apparatus 10-1 transmits the self data candidate via the transmitter 18 to one or more server apparatuses 10. Note that the server apparatuses 10-2 to 10-5 operate similarly to the server apparatus 10-1.

The selector 15 of the server apparatus 10-3 selects a data candidate (A) at random (determines the data candidate (A) as the self data candidate) because the number of requests indicating the same changes among the requests (A, A and B) is less than or equal to the threshold (2.5) and the changes are different from each other. Next, the selector 15 of the server apparatus 10-3 deletes the data candidates (A and B) that are not selected. Next, the selector 15 of the server apparatus 10-3 increases the round number of the self data candidate by one while increasing the current round number by one. The selector 15 of the server apparatus 10-3 transmits the self data candidate via the transmitter 18 to one or more server apparatuses 10. Note that the server apparatus 10-4 operates similarly to the server apparatus 10-3.

The upper diagram in FIG. 15 illustrates the states of the second storages 12 of the server apparatuses 10-1 to 10-5 after the second storages 12 receive the other data candidates from one or more server apparatuses 10 while the second storages 12 are in the states illustrated in the lower diagram of FIG. 14. The second storage 12 of the server apparatus 10-1 updates the state by receiving the request A in the second state, the request A in the first state, the request B in the first state, and the request A in the second state as the other data candidates from the other server apparatuses 10. The server apparatuses 10-2 to 10-5 also update the states by receiving the other data candidates from one or more server apparatuses 10.

The lower diagram in FIG. 15 illustrates the states after the processes with the changers 16. The changer 16 of the server apparatus 10-1 updates the history data in the first storage 11 and changes the data in the first storage 11 using a data candidate (A) among the data candidates including the requests (A, A, and A) in the second state because the number of requests (A, A, and A) in the second state among the requests (A, A, A, B and A) of the data candidates is larger than the threshold (2.5). Next, the changer 16 of the server apparatus 10-1 deletes all of the data candidates (A, A, A, B and A). Next, the changer 16 of the server apparatus 10-1 returns the current round number to one and increases the current order number by one. The changer 16 of the server apparatus 10-1 transmits the current order number to the other server apparatuses 10. Note that the server apparatuses 10-2 to 10-4 operate similarly to the server apparatus 10-1.

The changer 16 of the server apparatus 10-5 selects a data candidate from the data candidates including the requests (A and A) in the second state, and sets the state of the request (A) of the selected data candidate to the first state because the number of requests in the second state among the requests of the data candidates is less than the threshold (2.5), and there are both of the data candidate including the request in the first state and the data candidate including the request in the second state.

The history data and data in the first storage 11 of the server apparatus 10-5 are not updated in the information processing method described with reference to FIGS. 9 to 15. However, the server apparatus 10-5 updates the history data and data using the reception of the current order number from the server apparatus 10 as a trigger. In other words, when the receiver 13 of the server apparatus 10-5 receives a current order number from another server apparatus 10, the synchronizer 17 of the server apparatus 10-5 performs the process of the flowchart illustrated in FIG. 8. This updates the history data and data in the first storage 11.

The correctness of the information processing method according to the present embodiment will be described next. The information processing method according to the present embodiment the present embodiment is independently performed in each of the server apparatuses 10. In other words, note that the process results in each round may vary depending on the server apparatus 10. The requests to be linked to the current order numbers are not necessarily determined in the same round. The server apparatuses 10 may perform processes of different order numbers or different round numbers at a certain point because the server apparatuses 10 operate asynchronously. The processes with the receiver 13 and the synchronizer 17 include a process for catching up with an advance number when the server apparatus 10 receives a notification from a server apparatus 10 that performs the process of the advance order number or round number.

The correctness of the information processing method (algorithms) according to the present embodiment can be shown when the information processing method is proved to satisfy the Validity condition, Agreement condition, and Termination condition described below.

Validity condition: The request determined in each of the order numbers is any one of the requests received from the client apparatus 20.

Agreement condition: The request determined in each of the order numbers does not vary depending on the server apparatus 10.

Termination condition: When the majority of server apparatuses 10 are normal, the request of each order number is determined in the normal server apparatuses 10.

First, Validity condition will be described. In the information processing method according to the present embodiment, the access received from the client apparatus 20 when the round number=1 holds is determined as the self data candidate. The self data candidate is determined from the self data candidate determined in the preceding round and the other data candidates received from one or more server apparatuses 10 in the subsequent rounds. No request but the request originally received from the client apparatus 20 appears in any rounds. In other words, this satisfies Validity condition.

Agreement condition will be described next. To satisfy Agreement condition, it is necessary to prove that, when there is a server apparatus 10 that has determined the request to be linked to the current order number in a sequence of rounds, the same request is linked to the same current order number in the other server apparatuses 10 until the next process with the changer 16. First, if there is a data candidate in the second state in a process with the changer 16, note that it is the only data candidate. This is because the changer 16 sets the data candidate to the second state in accordance with the fact that the majority of data candidates are in the second state in the process with the selector 15 (the fact the only data candidate is determined from the majority of data candidates in the process with the selector 15 follows the fact that each of the server apparatuses 10 does not change the data candidate).

For example, a server apparatus 10 determines a request V as the request to be linked to the current order number in a round r. This means that the server apparatus 10 receives the data candidates including the requests V in the second state from the majority of the other server apparatuses 10 before the server apparatus 10 performs the process with the changer 16 in the round r.

In other words, the majority of the other server apparatuses 10 determine the request V as the request in the second state. This means that at least a request V is notified to any of the other server apparatuses 10 when the server apparatus 10 receives the data candidate to be used in the process with the changer 16 in the round r from the majority that is any combination of the other server apparatuses 10. Thus, if all of the server apparatuses 10 determine the request to be linked to the current order number in the round r, the request is necessarily the request V. Even if all of the server apparatuses 10 do not determine the request in the round r, the self data candidates to be used in the processes with the selectors 15 in the next round are the requests V. All of the selectors 15 determine the self data candidates as the data candidates including the requests V. Thus, the request V is determined as the request in the next process with the changer 16 as described above.

The correctness of the catch up operation with the receiver 13 and the synchronizer 17 will be described hereinafter. The concept of the catch up is that a server apparatus 10 diverts the results from the process with the other server apparatuses 10 as they are without determining the self data candidate because it is not necessary to determine the self data candidate in a round in which the majority of data candidates are in the same state except for the data candidate of the server apparatus 10. The server apparatus 10 does not have to necessarily include its own data candidate in the process in each round in the information processing method according to the present embodiment. Thus, a server apparatus 10 can divert the results from the processes with the other server apparatuses 10 as if the server apparatus 10 performs the process in each round. Thus, the catch up operation does not affect the correctness of the information processing method according to the present embodiment.

Finally, Termination condition will be described. The information processing method according to the present embodiment is algorithms in which, for example, a random number is used. This proves that probabilistic Termination is satisfied. In other words, this proves that the probability that the request to be linked to each order number is not determined eternally is almost nil when the majority of server apparatuses 10 are normal.

First, when the majority of server apparatuses 10 are normal, the majority of data candidates in the same state can be collected in the process in each round. Thus, the round number continues increasing until a request is linked to the current order number. In contrast, when the majority of server apparatuses 10 stop due to failure, a request is not linked to the current order number because it may be impossible to collect the data candidates from the majority of server apparatuses 10 (except for when a catch up operation is performed).

Vr is the total number of types of requests that appear as the data candidates in the processes with the selectors 15 in a round. Vr monotonically decrease with rounds (in other words, when r<s holds, Vr≥Vs holds). When Vr is one, a request is linked to the current order number in the next process with the changer 16 as described above. In light of the foregoing, when it can be shown that Vr truly decreases with a fixed probability or more until Vr becomes one, it is found that the probabilistic Termination is satisfied. When Vr>1 holds, there are necessarily requests V that do not account for the majority of data candidates in the processes with the selectors 15. The request V is not the data candidate in the second state when the changer 16 starts a process. The probability that the request v is not selected as the data candidate in the first state in the process with the selector 15 is higher than or equal to (1/N) in each of the server apparatuses 10. Thus, the probability that the requests v are not selected as the data candidate of the changers 16 in all of the server apparatuses 10 is higher than or equal to ((1/N)^N). When the requests v are not selected as the data candidate of the changers 16 in all of the server apparatuses 10, the requests V do not appear in the data candidates in the next processes with the selectors 15. Thus, Vr truly decreases. This proves that the probabilistic Termination is satisfied.

Supplemental description of the processes with the selector 15 and changer 16 according to the present embodiment will be added. The process with the selector 15 can be compared to a preliminary election, and the process with the changer 16 can be compared to a confidence vote. This is because the changer 16 determines the data candidate including the request to be linked to the current order number from the data candidates including the requests that the selectors 15 set to the second state (the data candidates that win in the preliminary election) (the changer 16 determines the data candidate in the confidence vote).

Figure 16:
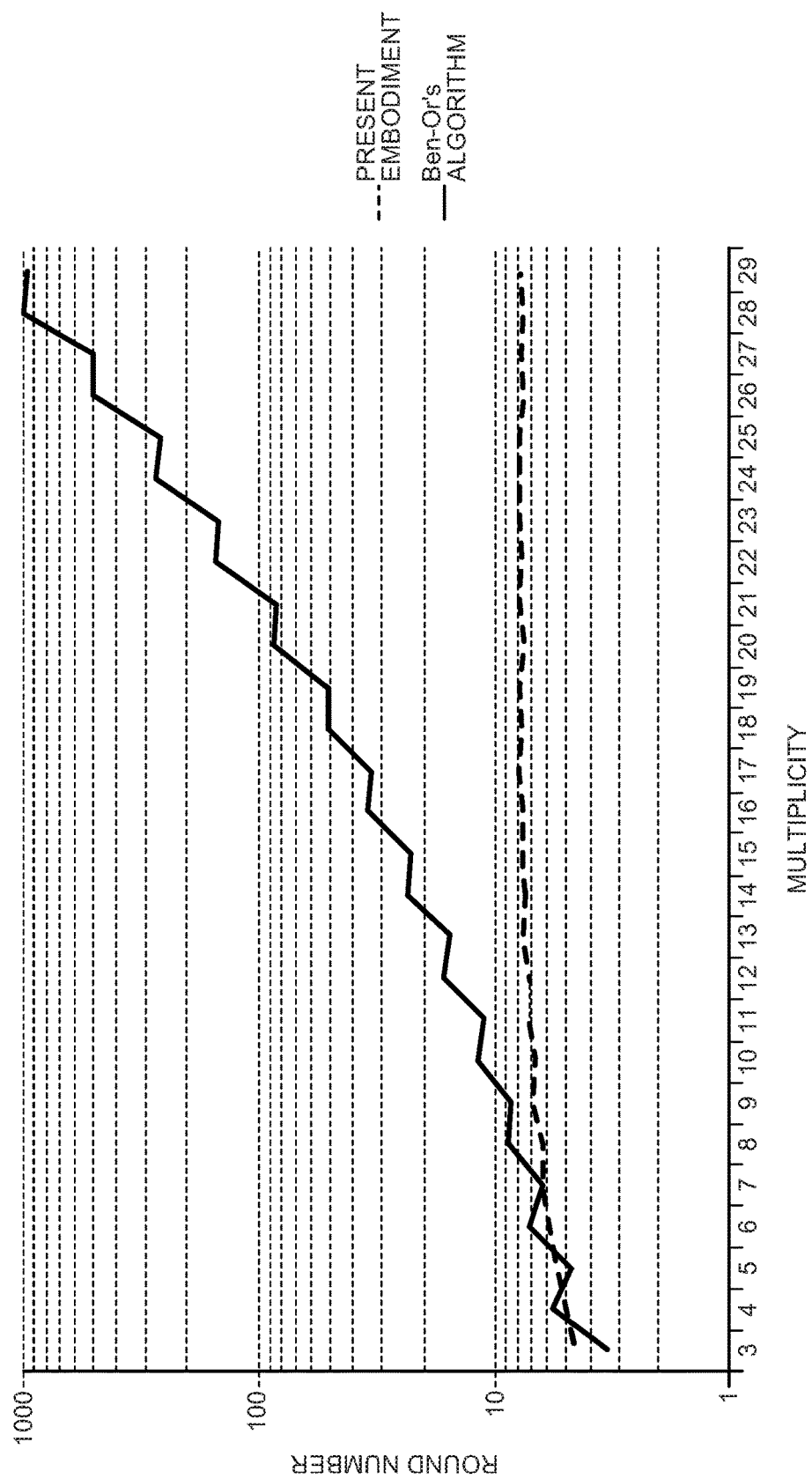
FIG. 16 is a view of the efficiency of the information processing method according to the embodiment.

The efficiency of the information processing method according to the present embodiment will be described next. FIG. 16 is a diagram of the efficiency of the information processing method according to the embodiment. Note that FIG. 16 illustrates also the result from Ben-Or's consensus algorithm for reference.

FIG. 16 illustrates the result from a simulation of the number of rounds required to obtain the consensus when the initial values are different, comparing the efficiency of Ben-Or's consensus algorithm with the efficiency of the information processing method according to the present embodiment. Note that the simulation is performed in an asynchronous network model. The average value of the results from 1000 rounds is found. The number of multiplexed server apparatuses 10 is set to three to 29.

In comparison with the information processing method according to the present embodiment, Ben-Or's consensus algorithm has the following characteristics.

The consensus value is only zero or one.

When there is no request to be set to the second state, the fact that requests are not set to the second state is notified to one or more server apparatuses 10.

The randomized data candidate is selected from arbitrary data candidates.

Each server apparatus 10 sequentially calculates rounds (without skipping a round).

On the other hand, the information processing method according to the present embodiment has the following characteristics.

Not two values but multiple values can be used as the consensus value.

When there is no request to be set to the second state, a data candidate in the first state is randomly selected and notified to one or more server apparatuses 10.

The randomized data candidate is selected only from the data candidates in the first state in the preceding round.

When a server apparatus receives a round number larger than the current round number, the server apparatus advances its own round number.

When a server apparatus does not determine the self data candidate, the server apparatus determines the received data candidate as the self data candidate.

The server apparatuses 10 do not perform processes necessarily in the same manner in the asynchronous network model. For example, the ratio of speed of the server apparatus 10-1 to the server apparatus 10-2 may be 100:1. Alternatively, the ratio may be reversed to 1:100 at a certain point. Delay may occur in the network 30. In the simulation, the probability that each of the server apparatuses 10 moves the next process at a certain point is set at random. The probability that the delivery of a packet to each of the server apparatuses 10 progresses is also set at random.

In Ben-Or's consensus algorithm, the initial value can be selected only from zero and one. In light of the foregoing, the initial value can be provided to each of the server apparatuses 10 at random. Multiple values can be used in the information processing method according to the present embodiment. The initial values differ in all of the server apparatuses 10. In comparison between the simulation results, the larger the multiplicity becomes, the more obvious the superiority of the information processing method according to the present embodiment is. Additionally, the information processing method according to the present embodiment is originally superior to Ben-Or's consensus algorithm because multiple values can be used as the initial value in the information processing method according to the present embodiment, whereas only zero or one can be the initial value in Ben-Or's consensus algorithm.

Figure 17:
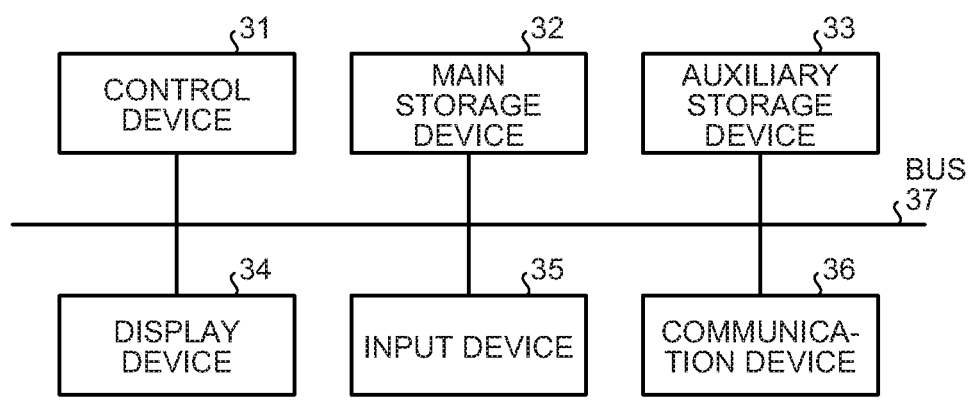
FIG. 17 is a view of an exemplary hardware configuration of the server apparatus and client apparatus according to the embodiment.

An exemplary hardware configuration of the server apparatus 10 and client apparatus 20 according to the present embodiment will be described finally. FIG. 17 is a diagram of an exemplary hardware configuration of the server apparatus 10 and client apparatus 20 according to the present embodiment.

The server apparatus 10 and client apparatus 20 according to the present embodiment include a control device 31, a main storage device 32, an auxiliary storage device 33, a display device 34, an input device 35, and a communication device 36. The control device 31, the main storage device 32, the auxiliary storage device 33, the display device 34, the input device 35, and the communication device 36 are connected to each other via a bus 37.

The control device 31 executes a program read from the auxiliary storage device 33 to the main storage device 32. The main storage device 32 is a memory such as Read Only Memory (ROM), or Random Access Memory (RAM). The auxiliary storage device 33 is, for example, a hard disk, or a memory card. The display device 34 is a screen, for example, that displays the state of the server apparatus 10 and the client apparatus 20. The display device 34 is, for example, a liquid crystal display. The input device 35 is an interface used to operate the server apparatus 10 and the client apparatus 20. The input device 35 is, for example, a keyboard or a mouse. The communication device 36 is an interface that connects the server apparatus 10 and the client apparatus 20 to a network.

The programs to be executed in the server apparatus 10 and client apparatus 20 according to the present embodiment can be recorded as a file in an installable or executable format in a computer readable recording medium such as a CD-ROM, a memory card, a CD-R and a Digital Versatile Disk (DVD), and can be provided as a computer program product. The programs to be executed in the server apparatus 10 and client apparatus 20 according to the present embodiment can be stored on a computer connected to a network such as the Internet, and can be provided by downloading via the network. Alternatively, the programs to be executed in the server apparatus 10 and client apparatus 20 according to the present embodiment can be provided or distributed via a network such as the Internet without downloading the program. The programs in the server apparatus 10 and client apparatus 20 according to the present embodiment can previously be incorporated, for example, in the ROM.

The program to be executed in the server apparatus 10 according to the present embodiment is a module configuration including functional blocks (the receiver 13, the generator 14, the selector 15, the changer 16, the synchronizer 17, and the transmitter 18) that can be implemented as programs among the functional blocks in the server apparatus 10.

The program to be executed in client apparatus 20 according to the present embodiment is a module configuration including the transmitter 21 of the client apparatus 20.

The control device 31 reads the program from the recording medium and executes the program. This loads each of the modules into the main storage device 32 as actual hardware. In other words, each of the modules is generated on the main storage device 32. Note that some or all of the functional blocks in the server apparatus 10 and client apparatus 20 can be implemented with hardware such as an Integrated Circuit (IC) instead of the programs.

In the information processing system 100 according to the present embodiment, each of the server apparatuses 10 includes the selector 15 and the changer 16. Each of the server apparatuses 10 can determine a request to be linked to the current order number of the history data by alternatively repeating the processes with the selector 15 and the changer 16. This secures the consistency of data among the server apparatuses 10 even if any failure due to the combination of the server apparatuses 10 (for example, the delay or stop of the process with the server apparatus, and the congestion or packet loss on the network) occurs. Under the condition that the majority of server apparatuses 10 operate normally, a request to be linked to the current order number can uniquely be determined.

The information processing system 100 according to the present embodiment does not lose the consistency of the history data and thus does not lose the consistency of information multiplexed with the server apparatuses 10 even if any failure due to the combination occurs. Additionally, there is no server apparatus 10 that is a single-failure point (Single Point of Failure) in the information processing system 100 according to the present embodiment even if any failure due to the combination occurs. This is because the information processing method (algorithms) for the server apparatuses 10 is symmetric. This enables the client apparatus 20 to transmit a request to an arbitrary server apparatus 10.

Note that the request to be linked to the current order number in the history data is uniquely determined among the server apparatuses 10 in the information processing method according to the present embodiment. However, the information processing method according to the present embodiment can be applied not only to the server apparatus 10 but also to a process on a personal computer, a virtual machine, or an Operating System (OS). Similarly, the client apparatus 20 can be a process on a personal computer, a virtual machine, or an Operating System (OS). The network 30 can be a LAN or a wide area network (WAN), or a virtual network or an Inter Process Communication (IPC).

The same threshold is set for the selector 15 and the changer 16 in the information processing method according to the present embodiment. However, different values can be set as thresholds for the selector 15 and the changer 16, for example, a first threshold is set for the selector 15, and a second threshold is set for the changer 16.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing system comprising:
one or more client apparatuses;
and N server apparatuses configured to store data, N being an integer larger than or equal to three, wherein each client apparatus includes
a transmitter configured to transmit a request indicating changes of the data to any one of the server apparatuses,
and each server apparatus includes a first storage configured to store the data and history data in which the request is linked to an order number that indicates an order in which the data is changed in accordance with the changes in the request,
a receiver configured to receive the request from the client apparatus, and receive a data candidate, the data candidate including a current order number that indicates an unused order number among the order numbers, the request that is a candidate to be registered in the history data with the current order number, and a state of the request from one or more server apparatuses,
a generator configured to set a state of the request received from the client apparatus to a first state, and generate a data candidate including the request in the first state, and the current order number,
a selector configured to, when the number of requests indicating identical changes among the requests of the data candidates is larger than a first threshold, select one of the requests indicating the identical changes, and set a state of the selected request to a second state,
a transmitter configured to transmit the data candidate including the selected request to one or more server apparatuses, and a changer configured to, when the number of requests in the second state among the requests of the data candidates is larger than a second threshold, update the history data and change the data by using one of the data candidates including the requests in the second state.

2. The system according to claim 1, wherein each of the first threshold and the second threshold is N/2.

3. The information processing system according to claim 1, wherein, when there is a request indicating different changes among the requests of the data candidates, the selector selects one of the data candidates, and the transmitter of the server apparatus transmits the selected data candidate to the one or more server apparatuses.

4. The system according to claim 1, wherein, when there are both of the data candidate including the request in the first state and the data candidate including the request in the second state among the requests of the data candidates, the changer selects one of the data candidates including the requests in the second state, and sets a state of the request of the selected candidate to the first state, and the transmitter of the server apparatus transmits the selected data candidate including the request to one or more server apparatuses.

5. The system according to claim 1, wherein, when the number of requests in the first state among the requests of the data candidates is larger than the second threshold, the changer selects one of the data candidates, and the transmitter of the server apparatus transmits the selected data candidate to one or more server apparatuses.

6. The system according to claim 1, wherein, when the server apparatus does not determine the data candidate, the receiver sets a state of a request included in the data candidate received from another server apparatus to the first state, and determines the received data candidate as the data candidate of the server apparatus.

7. The system according to claim 1, wherein, the server apparatus further includes a second storage configured to temporarily store the data candidates, the receiver stores the data candidates received from one or more server apparatuses in the second storage, the selector deletes the data candidate including the request that the selector does not select in the second storage, and the changer deletes the data candidate that the changer does not select in the second storage.

8. The system according to claim 7, further comprising: a synchronizer configured to, when the current order number of the data candidate that the receiver receives from another server apparatus is larger than the current order number in the history data, delete the data candidate in the second storage, and request the other server apparatus that has transmitted the current order number to transmit the history data.

9. The system according to claim 8, wherein, the receiver receives the current order number from another server apparatus when the server apparatus updates the history data, when the current order number received from the server apparatus is larger than the current order number of the history data,
the synchronizer deletes the data candidate in the second storage and requests the server apparatus that has transmitted the current order number to transmit the history data, the changer increases the current order number by one when the history data is updated and transmits the order number increased by one to the other server apparatuses.

10. The system according to claim 8, wherein the generator generates the data candidate further including a round number in which an initial value is set, the second storage further stores a latest round number as a current round number,
the selector increases the round number of the selected data candidate by one and stores the round number increased by one as the current round number in the second storage,
the changer increases the round number of the selected data candidate by one, stores the round number increased by one as the current round number in the second storage, and returns the current round number to an initial value when the history data is updated with the selected data candidate, and when the receiver receives the data candidate and the round number of the received data candidate is larger than the current round number,
the synchronizer deletes the data candidate in the second storage, stores the received data candidate in the second storage, and determines the current round number as the round number of the received data candidate.

11. A server apparatus that receives a request indicating changes of data from a client apparatus, the server apparatus comprising:
N server apparatuses configured to store data, N being an integer larger than or equal to three, wherein each client apparatus includes:
a first storage configured to store the data and history data in which the request is linked to an order number that indicates an order in which the data is changed in accordance with the changes in the request;
a receiver configured to receive the request from the client apparatus, and receive a data candidate, the data candidate including a current order number that indicates an unused order number among the order numbers, the request that is a candidate to be registered in the history data with the current order number, and a state of the request from one or more server apparatuses;
a generator configured to set a state of the request received from the client apparatus to a first state, and generate a data candidate including the request in the first state, and the current order number; a selector configured to, when the number of requests indicating identical changes among the requests of the data candidates is larger than a first threshold, select one of the requests indicating the identical changes, and set a state of the selected request to a second state; a transmitter configured to transmit the data candidate including the selected request to one or more server apparatuses;
and a changer that, when the number of requests in the second state among the requests of the data candidates is larger than a second threshold, updates the history data and changes the data by using one of the data candidates including the requests in the second state.

12. An information processing method for an information processing system including one or more client apparatuses and N server apparatuses that store data, N being an integer larger than or equal to three, the method comprising:
transmitting, by the client apparatus, a request indicating changes of the data to any one of the server apparatuses, storing, by the server apparatus, the data and the history data in which the request is linked to an order number that indicates an order in which the data is changed in accordance with the changes in the request;
receiving, by the server apparatus, the request from the client apparatus, and receives a data candidate, the data candidate including a current order number that indicates an unused order number among the order numbers, the request that is a candidate to be registered in the history data with the current order number, and a state of the request from one or more server apparatuses;

setting, by the server apparatus, a state of the request received from the client apparatus to a first state;

generating, by the server apparatus, a data candidate including the request in the first state, and the current order number;

when the number of requests indicating identical changes among the requests of the data candidates is larger than a first threshold, selecting, by the server apparatus, one of the requests indicating the identical changes, and setting, by the server apparatus, a state of the selected request to a second state;

transmitting, by the server apparatus, the data candidate including the selected request to one or more server apparatuses;

and when the number of requests in the second state among the requests of the data candidates is larger than a second threshold, updating, by the server apparatus, the history data and changing, by the server apparatus, the data by using one of the data candidates including the requests in the second state.

13. A computer program product comprising a computer-readable device containing a program executed by a computer of a server apparatus that includes a first storage configured to store history data in which a request indicating changes of data is linked to an order number indicating an order in which the request is stored, and receives the request from a client apparatus, the program causing the computer to execute: receiving the request from the client apparatus;

receiving a data candidate, the data candidate including a current order number that indicates an unused order number among the order numbers, the request that is a candidate to be registered in the history data with the current order number, and a state of the request from one or more server apparatuses;

setting a state of the request received from the client apparatus to a first state; generating a data candidate including the request in the first state, and the current order number;

when the number of requests indicating identical changes among the requests of the data candidates is larger than a first threshold, selecting one of the requests indicating the identical changes, and setting a state of the selected request to a second state; transmitting the data candidate including the selected request to one or more server apparatuses;

and when the number of requests in the second state among the requests of the data candidates is larger than a second threshold, updating the history data and changing the data by using one of the data candidates including the requests in the second state.

* * * * *